(12) United States Patent
Pohlmüller et al.

(10) Patent No.: US 11,541,724 B2
(45) Date of Patent: Jan. 3, 2023

(54) HEATING MODULE FOR A HEATING SYSTEM OF A HABITABLE VEHICLE

(71) Applicant: Truma Gerätetechnik GmbH & Co. KG, Putzbrunn (DE)

(72) Inventors: Adam Pohlmüller, Feldkirchen (DE); Siegfried Piegsa, Putzbrunn (DE); Fikret Erdogan, Haar (DE); Kamil Ünnü, Munich (DE); Mario Möhring, Sauerlach (DE); Johannes Laging, Munich (DE); Mihai Dömötör, Munich (DE)

(73) Assignee: TRUMA GERÄTETECHNIK GMBH & CO. KG, Putzbrunn (DE)

( * ) Notice: Subject to any disclaimer, the term of this patent is extended or adjusted under 35 U.S.C. 154(b) by 204 days.

(21) Appl. No.: 16/770,353

(22) PCT Filed: Dec. 3, 2018

(86) PCT No.: PCT/EP2018/083348
§ 371 (c)(1),
(2) Date: Jun. 5, 2020

(87) PCT Pub. No.: WO2019/110506
PCT Pub. Date: Jun. 13, 2019

(65) Prior Publication Data
US 2020/0298667 A1 Sep. 24, 2020

(30) Foreign Application Priority Data
Dec. 6, 2017 (DE) .................... 10 2017 129 031.1

(51) Int. Cl.
*B60H 1/22* (2006.01)
*B60H 1/00* (2006.01)
*F24H 3/04* (2022.01)

(52) U.S. Cl.
CPC ....... *B60H 1/2215* (2013.01); *B60H 1/00364* (2013.01); *F24H 3/0429* (2013.01); *B60H 2001/2268* (2013.01)

(58) Field of Classification Search
CPC .............. B60H 1/2215; B60H 1/00364; B60H 2001/2268; B60H 2001/00092; B60H 2001/00542; F24F 3/0429
See application file for complete search history.

(56) References Cited

U.S. PATENT DOCUMENTS

| 1,232,598 A | 7/1917 | Norstrom et al. |
| 2,656,782 A | 10/1953 | Labus |

(Continued)

FOREIGN PATENT DOCUMENTS

| CN | 1366602 A | 8/2002 |
| CN | 101121374 A | 2/2008 |

(Continued)

*Primary Examiner* — Emmanuel E Duke
(74) *Attorney, Agent, or Firm* — Murphy, Bilak & Homiller, PLLC

(57) ABSTRACT

Disclosed is a heating module (12) for a heating system (10) of a habitable vehicle, the module comprising: a module housing (36) having an air inlet opening (56) and an air outlet opening (58); an air conduction element (76) which is accommodated in the module housing (36), has multiple conduction sections (92, 94, 96), and is connected to the air inlet opening (56) and the air outlet opening (58); and at least one heating element (110, 112; 210, 212), said heating element (110, 112; 210, 212) being designed to heat air flowing from the air inlet opening (56) to the air outlet opening (58).

8 Claims, 11 Drawing Sheets

(56) References Cited

U.S. PATENT DOCUMENTS

| | | | |
|---|---|---|---|
| 4,142,413 A | 3/1979 | Bellinga | |
| 4,520,844 A | 6/1985 | Finkelstein et al. | |
| 4,610,703 A | 9/1986 | Kowalczyk | |
| 4,814,579 A | 3/1989 | Mathis et al. | |
| 5,476,012 A * | 12/1995 | Takashima | G01F 1/6842 73/202.5 |
| 6,705,159 B2 * | 3/2004 | Lenzing | G01F 15/12 73/202.5 |
| 9,167,629 B2 | 10/2015 | Obst et al. | |
| 2006/0249499 A1 | 11/2006 | Winkler | |
| 2008/0032618 A1 | 2/2008 | Katoh et al. | |
| 2009/0239463 A1 | 9/2009 | Goenka | |
| 2010/0072186 A1 | 3/2010 | Schehr | |
| 2012/0315024 A1 * | 12/2012 | Obst | F24H 1/121 392/465 |
| 2013/0269428 A1 * | 10/2013 | Baur | G01K 1/08 29/595 |
| 2018/0119412 A1 * | 5/2018 | Klupazek | E04B 1/40 |

FOREIGN PATENT DOCUMENTS

| | | |
|---|---|---|
| CN | 106414129 A | 2/2017 |
| DE | 1079808 B | 4/1960 |
| DE | 1906045 U | 12/1964 |
| DE | 6930121 U | 3/1970 |
| DE | 1579775 A1 | 4/1971 |
| DE | 8502450 | 6/1985 |
| DE | 19753373 A1 | 6/1998 |
| DE | 19942502 A1 | 3/2001 |
| DE | 10016642 A1 | 10/2001 |
| DE | 10121904 A1 | 11/2002 |
| DE | 20304546 U1 | 6/2003 |
| DE | 102010060446 A1 | 5/2011 |
| DE | 102010001811 A1 | 8/2011 |
| DE | 102013001441 A1 | 7/2014 |
| DE | 102013001441 A1 * | 7/2014 |
| DE | 102014215682 B3 | 12/2015 |
| DE | 112015001472 T5 | 12/2016 |
| DE | 102015016613 A1 | 6/2017 |
| GB | 2322103 | 8/1998 |
| KR | 20110135590 A | 12/2011 |
| KR | 101715575 B1 | 3/2017 |
| WO | 03045747 A2 | 6/2003 |
| WO | 2008043343 A1 | 4/2008 |

* cited by examiner

A)

B)

A)

B)

A)

B)

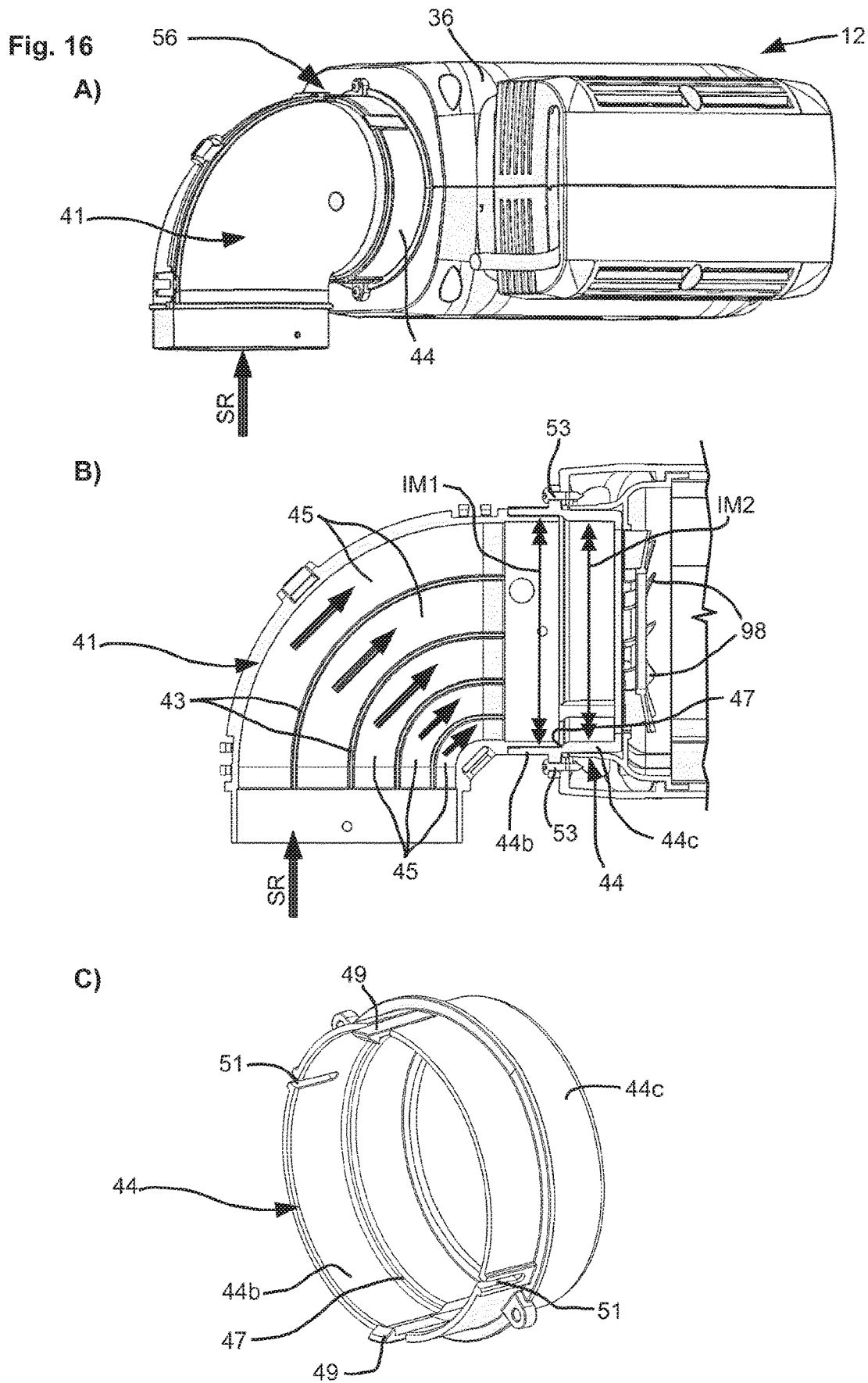

HEATING MODULE FOR A HEATING SYSTEM OF A HABITABLE VEHICLE

The invention relates to a heating module for a heating system of a habitable vehicle.

The term "habitable vehicle" is understood to mean all types of powered or non-powered vehicles in which a person or a plurality of persons can also live. Such habitable vehicles are, in particular, motor homes, trailers or ships or boats.

Previous heating systems for habitable vehicles are based on the principle that heated air exits, from a normally central heating installation, into the habitable space or is distributed to various locations within the habitable space via a system of pipes or tubes. Usually, a heating aggregate (electric or gas powered) and a blower are accommodated within this heating installation. To be able to ensure a corresponding heating performance, more powerful and thus normally larger heating installations in terms of their dimensions are correspondingly required for larger inhabitable space.

The invention is based on the object to provide a flexibly insertable heating module for a heating system, which has little space requirements and can be functionally integrated into the heating system.

This object is solved by an electric heating module according to the independent claim 1. Possible embodiments of the heating module are contained in the dependent claims.

A heating module for a heating system for a habitable vehicle is provided, the heating module comprising:
- a module housing with an air inlet opening and an air outlet opening,
- an air conduction element housed within the module housing, which has a plurality of conduction sections and which is connected to the air inlet opening and the air outlet opening, and
- at least one heating element, wherein the heating element is adapted to heat air flowing from the air inlet opening to the air outlet opening.

The heating module allows, in one embodiment, the connection to further components, so that in total a heating system is created.

Such a heating module, which, in particular, has no blower device of its own, can be flexibly installed in and inserted into a heating system. In this process, the space requirements of the heating module are very low.

The air inlet opening can be adapted to be connectable to a blower device separate from the heating module.

In an alternative embodiment, the heating module is an independent heating installation. For this purpose, the heating module preferably has, in one embodiment, a blower device.

The heating module can have a sensor device adapted to record the temperature of the air flowing through the heating module.

Furthermore, the heating module can have a control device adapted to control the heating module. In this process, the control device can have an interface adapted to provide a communication connection to a device separate from the heating module.

Due to the control device with its interface, the heating module can, in terms of control, also be integrated into a heating system.

The sensor device can, related to a flow cross section of the heating module, be arranged within a central area of an air conduction element. In particular, the area of a heated airflow is thereby measured in which there usually is, distributed over the flow cross section, the maximum temperature, so that the emission of air heated too much can be reliably excluded. This, in particular, allows the prevention of risk of heat damage to building components of the vehicle or of personal injuries.

A deviation of the position of the sensor device relative to a center of the flow cross section can be less than or equal to 20% of a diameter of the air conduction element. Furthermore, the sensor device can be arranged along a—preferably centric—longitudinal axis of the air conduction element. The substantially central arrangement with regard to the cross section or along the longitudinal axis serves the purpose that the heating module can be used with different installation positions (thus also different rotational positions relative to gravity), with the sensor device measuring reliably in each case. If the sensor device was, for example, not centrally arranged, but closer to a wall, then the sensor device would possibly react later in time if the wall was further distanced from the earth gravitation field and the air would thus be located "further below".

In one embodiment, the sensor device is located within a recirculation region of a displacement element. Thus, the displacement element displaces the air radially outwards, and the sensor device is located in the area into which the displaced air flows back again.

In a supplementary or alternative embodiment, the sensor device is located in a cross section of the displacement element or in a projection of the cross section, thus, e.g., in the geometrical extension of the cross section. In particular, the sensor device is located, in a direction of the airflow, behind the displacement element.

The displacement element can be configured in such a manner that it directs air around the sensor device, so that air deflected by the displacement element reaches the sensor device. In addition, it can be provided that only the deflected air reaches the sensor device. Thus, a direct contact of the sensor device with the actual airflow is thereby avoided.

The air conduction element can have at least two of the following components or conduction sections:
- a first conduction section which is connected to the air inlet opening,
- a second conduction section which is connected to the air outlet opening, and
- a third conduction section which is housed between the first and second conduction sections and connected to them.

The air conduction element forms—so to speak—an interior housing of the module housing. In this process, the air conduction element can be optimized with regard to the flow of air, in particular, in respect of its form or its cross section. The air conduction element can, in particular, be configured circularly or elliptically in the cross section. Irrespective thereof, the module housing can have another outer configuration, in particular, the module housing can substantially have flat external surfaces, which simplify the installation along normally flat vehicle structures, such as walls, claddings, floor and the like.

The conduction sections can be configured as pipe-like building components. In this process, each conduction section can be a stable building component in itself. The conduction sections can be connected to one another at their respective ends, and the conduction sections can, in particular, be configured in such a manner that the first conduction section and the second conduction sections are coupled to the third conduction section by means of a form-locking connection, such as a plug connection or snap-on connection. However, also other types of connection are conceivable, such as a threaded connection where a short external thread is provided on a conduction section and a corresponding internal thread on the other conduction section. Furthermore, if required, the conduction sections can also be connected to one another in a material-locking manner, for example, by bonding.

The heating element of the heating module can, in the direction of flow, be arranged behind the first conduction section. In particular, the heating element can be housed within the third conduction section. Hence, the heating module can normally be installed in a very simple and space-saving manner since only a connection to a source of energy, for example, power connection, must be provided. Furthermore, the heating module can also be easily integrated into an existing heating system. In this process, it is particularly advantageous that the heating module has air passively passed through it, i.e. the heating module itself does not have an installed blower.

According to one embodiment, the air conduction element, related to a median plane orthogonal to the direction of flow, is configured substantially symmetrically, so that the heating module can be arbitrarily oriented when installed in a heating system. In this process, in particular, the first conduction section and the second conduction section can be configured substantially uniform or identical.

A flow channel of the air conduction element can be configured in a cross section symmetrical manner. This, in particular, enables arbitrarily twisted installation of the heating module, in particular, twisted in relation to pipe or hose connections, or twisted in relation to a structural building component of the vehicle, such as a wall or a floor.

In the heating module, the sensor device can be arranged within a sensor holder held by a plurality of bars, wherein the bars are provided on the second conduction section or on the first conduction section and substantially extend in a radial direction from the sensor holder. In this process, the extension in a radial direction, in particular, describes that the struts run from radially inside to radially outside related to a, for example, circular conduction section. However, the term "extension in a radial direction" is not to define whether the strut follows the radius in a precisely straight manner, or whether the strut may be configured in an easily inclined manner to the radius or in an arch-shaped manner or in a curved manner.

Some or all bars can have an air conduction channel configured to direct passing air in the direction of the sensor device. Air can thereby be supplied to the sensor from various areas of, in particular, the heated airflow. In the area of the sensor, the air from the various flow areas is mixed, so that, where required, differences in temperature can be somewhat compensated for in the various flow areas. Correspondingly, it can thereby be guaranteed that the sensor device measures or records an average temperature of the heated airflow.

Some or all bars can consist of a temperature-conducting material. Preferable, the material used has a thermal conductivity greater than or equal to 15 W/(m*K). It is, for example, conceivable that the bars are configured as copper bars in some sort of star formation.

The sensor device can be arranged within the third conduction section, with one bar holding the sensor device.

Furthermore, the sensor device can be configured as a fuse, preferably as a safety fuse, which reacts to exceeding a specific temperature.

The sensor device can have at least two thermal fuses spaced axially from one another along a longitudinal axis of the air conduction element.

In one embodiment, the heating element has a plurality of separate heating components, e.g. separate heating coils. In this process, each of the heating components is allocated to a thermal fuse.

The heating module can have a displacement element adapted to displace air flowing through radially outwards. In this process, the displacement element can be connected to the sensor holder. Furthermore, the displacement element can be adapted to direct the main flow of heated air around the sensor device. The displacement element ensures that the sensor device does not directly or indirectly come into contact with the main flow of the heated air. Rather, the heated air is first of all conducted around the displacement element and the sensor device and is subsequently directed to the sensor device by means of the aforementioned air conduction channels within the bars. In this process, the deflected air substantially flows from radially outside to radially inside towards the sensor device. The sensor device can, with regard to the air conduction channels within the bars related to the main flow direction, also be arranged upstream. The mixing of air whose temperature is recorded can thereby be improved even more.

In one embodiment, the sensor device is located within the recirculation region behind a displacement element. Hence, the displacement element displaces the air radially outside, and the sensor device is located within the region into which the air flows back again, so that the temperature measurement takes place in this region.

The displacement element can also have an end-to-end recess to conduct air. In one embodiment, for example, the air within the recess is led contrary to the direction of flow in the flow channel, i.e. from the air inlet opening to the air outlet opening, and thus led back, so to speak. Hence, the air in the recess flows from the direction of the air outlet opening to the direction of the air inlet opening. In one embodiment, a sensor device is located within the recess.

An external side of the displacement element and the interior side of the air conduction element can restrict an annular flow channel section. In this process, in particular, due to the dimensioning of the displacement element, influence can be taken on the design of the annular flow cross section. In this process, a kind of nozzle action is created due to a narrowing of the flow cross section, so that the heated air is somewhat accelerated towards the air outlet opening.

The displacement element can, in the direction of flow, be arranged between the heating coal and the air outlet opening. This means that the displacement element is only effective in one part of the flow cross section of the heating module. The displacement element can, in particular, be configured as a hemispherical or parabolic cover. Such a cover can be arranged upstream of the sensor device and protect the sensor device from the direct airflow.

Alternatively, the displacement element can, in the direction of flow, be arranged between the air inlet opening and the air outlet opening and surrounded by windings of the heating coil or generally by the active components of a heating element. In such an embodiment, the displacement element substantially extends over the entire length of the air conduction element, in particular, it extends over the entire length of the third conduction section. In this process, the flow cross section is configured annularly over practically the entire length of the heating module.

The heating element can be configured as an electric heating element. In this process, the heating element can have at least one heating coil with a plurality of windings.

The heating module or the electric heating element can have two heating coils which are successively arranged in the direction of flow. The two heating coils can preferably be controlled individually. Alternatively, both heating coils are equally controlled. The provision of two heating coils enables, in particular, a two-stage operation of the heating module. In this process, only one heating coil can be heated in a first stage. In a second stage, electricity passes through and heats both heating coils.

Alternatively to a sequential arrangement of two heating coils, two heating coils can also be arranged in such a manner that, in the direction of flow, a winding of the one heating coil follows a winding of the other heating coil. That is, the windings of the two heating coils alternate in such an embodiment. In other words: one can also say that the windings overlap or are intertwined in the direction of flow. Also in this embodiment, it is possible to enable the aforementioned two-stage operation.

In the heating module, successive windings of the same heating coil can have a changing diameter in the direction of flow. In particular, the diameter from one winding to the next (adjacent) winding can become greater or smaller. The heat transmission to the passing air can thereby be impacted and optimized. In one embodiment, the diameter constantly changes in one direction.

The control device of the heating module can be accommodated within an additional housing arranged on the module housing. In this process, the additional housing can be adapted to house a printed circuit board associated with the control device. The additional housing enables easy access to the control device, in order to be able to easily exchange or configure it, if required. Furthermore, the additional housing can be provided with sufficient ventilation slots, in order to be able to prevent overheating of the control device.

To support a compact design of the heating module, the additional housing can be configured in such a manner that it restricts, with an external side of the module housing, the housing space for the control device. In this process, the control device is therefore housed within the space formed by an external side of the module housing and, in addition, by the additional housing. In this process, the additional housing can be pushable or pluggable onto the module housing.

The heating module can have at least one deflector arranged on a conduction section, which is connected to the air inlet opening or to the air outlet opening, with the deflector being configured as a ring through which the air passes. In this process, the deflector configured as a ring can have an internal diameter changing in the direction of flow. For example, the ring can be configured conically, in particular, expand conically in the direction of flow.

The heating module can have a plurality of deflectors, which are arranged on a conduction section connected to the air inlet opening or to the air outlet opening. In this process, the deflectors can have a constant relative position to the conduction section. Thus, the deflectors are, in one embodiment, not moved relative to the module housing, but are statically fixed. Furthermore, the deflectors can be arranged along a circle, so that a deflecting collar is formed. The deflectors service, in particular, to distribute the conveyed air within the heating module or have the conveyed air flow within the heating module in such a manner that optimum heat transfer can occur in the area of the heating coil. Furthermore, the deflectors cause improved mixing of the air arriving at the heating module and subsequent more equal heating.

The deflectors can be arranged along two circles, so that, related to the radial direction, an inner deflecting collar and an outer deflecting collar are formed. In this process, the inner deflecting collar can have deflectors, which differ from the deflectors of the outer deflecting collar with regard to the direction of deflection of the airflow. In particular, the flow of air into the heating module can thereby be optimized.

The deflector configured as a ring can also act as a carrier of deflectors arranged within the circle.

In the heating module, the sensor device can be arranged within an adapter device, which is reversibly connectable to the air inlet opening or to the air outlet opening of the module housing.

The deflector or the plurality of deflectors can be arranged within an adapter device, which is reversibly connectable to the air inlet opening of the module housing. Thus, the deflection or the measurement can thereby be effected by components, which are pluggable by the adapter. Therefore, e.g., two heating units could be plugged one after the other, and the adapters would each be mounted at the inlet and outlet.

Furthermore, the deflector or the plurality of deflectors can surround a central section, which permits a direct axial direction flow. Such a central section would, related to the flow cross section, form a free recess, through which the air can substantially flow unhindered.

Depending on the embodiment, the adapter device can serve to connect, for example, components or pipes to the heating module. In other embodiments, the adapter device can also have building components which assume an additional function. This is, for example, a homogenization of the airflow over at least one deflector and/or determination of a temperature, with a mix of different fields of temperature being effected by at least one displacement element. These adapter devices with an additional functionality allow, for example, the modular assembly of the heating module or a combination of a plurality of heating modules.

Providing deflectors in the area of the air inlet opening or in the area of the first conduction section of the air conduction element also has the advantage that the heating module can be coupled to different upstream blower devices or other system components. Due to the deflectors, air conveyed to the heating module is in any case directed or deflected in such a manner that an airflow enhanced for the heating module and for heating the air can be generated within the air conduction element.

In one embodiment, at least one air conduction component, preferably in the form of a pipe bend, is available for homogenization of a flow of air conducted within the air conduction component. In this embodiment, for example, the function of homogenizing the airflow, as performed within the first conduction section, is extended outwards into the area of the air conduction component. The homogenization of the airflow, in particular, over the flow cross section, serves, in turn, the purpose that the air is heated more effectively.

In one embodiment, the air conduction component can have at least one pipe bend with bend sections. In this process, the bend sections restrict channels within the pipe bend. In addition, the channels serve to conduct air. In this process, the pipe bend can be configured elongated or comprise an angle.

The pipe bend, as an exemplary embodiment of the air conduction component, generally serves to generate a substantially uniform airflow, by dividing an airflow entering into the pipe bend, so to speak, and conducting it through the individual channels.

In addition, in another embodiment, the air conduction component can be connectable or connected to the air inlet opening or to the air outlet opening.

The first heating module can, in one embodiment, be connectable, both directly and via an adapter device, to at least one separate entity, for example, a blower device or a general system component or a pipe or a tube or a pipe bend, or to at least two different separate entities, so that a deflection of air takes place within a conduction section of the first heating module or within the entity connected to the first heating module directly or via the adapter device. As part of the heating system, the first heating module is correspondingly connected to the separate entity. Thus, the first heating module or specifically the housing of the first heating module can be configured in such a manner that the air inlet opening and/or the air outlet opening allow, depending on the use of the heating module, a direct or indirect connection to a separate entity. In an extended embodiment, such direct or indirection connection can occur to two different entities (e.g. a device with a blower and a pipe). Therefore, the particular opening allows a direct combination and a connection via an adapter device. The separate entity is, for example, a blower device or another, where required, active system component (e.g. a heating installation or an air conditioning system). Alternatively, however, the separate entity can mainly also serve to conduct air, inasmuch as such entity is a pipe or a tube. In this process, the connection is to be of such a kind, and where the first heating module has such quality, that the deflection of the air, in particular, for the purpose of homogenizing the air, takes place both within a conduction section of the first heating module (in particular, the first or second conduction section) and within the connected entity. Thus, in this embodiment, a separate component or a separate building component is integrated and used for a function of the heating module, so that the function of deflecting or homogenizing the air is conducted from the first heating module.

The aforedescribed heating module can, in a heating system described in the following text, be inserted as the first heating module. If, in the following text, the term "heating module" is used alone, it is to be understood as the "first heating module" in connection with the description of the heating system. In this respect, the terms "heating module" alone and "first heating module" describe identical components, whereas the term "second heating module" describes another building component. The heating system can have the features listed in the following text.

A heating system for a habitable vehicle can be provided, comprising:
  a first heating module, which is housed within a first module housing, with the first heating module having an air inlet opening and an air outlet opening,
  a blower device separate from the first heating module housed within a second module housing, wherein the blower device and the first heating module are connected to one another, in terms of airflow, by means of a connection arrangement, and
wherein the blower device is, relative to the first heating module, arranged in such a manner that air conveyed by the blower device enters the first heating module at the air inlet opening, flows through the first heating module and exits the first module at the air outlet opening again.

The blower device can be an independent blower device or part of a heating unit or of an air-conditioning unit.

In such a heating system, the individual components are available as modules and can, dependent on the available building space, be installed at different locations.

The blower device can be arranged upstream of the first heating module.

In one embodiment, the heating system can additionally have a control device connected wirelessly or wired to the first heating module and to the blower device, which is adapted to control the first heating module and the blower device.

Due to the control device provided for such a modular heating system, the various modules or components of the heating system can be easily controlled even if the modules or components should be arranged at a distance from one another.

In the heating system, the first heating module can have a sensor device adapted to record the temperature of the air passing through the first heating module. In particular, the temperature of the air exiting from the heating module can thereby be recorded, so that it does not become too hot when exiting into the habitable space. This, in particular, allows the prevention of risk of heat damage to building components of the vehicle or of personal injuries.

The first heating module can have an air conduction element accommodated within the first module housing, the air conduction element having a plurality of conduction sections connected to one another, which are successively arranged between the air inlet opening and the air outlet opening. The air conduction element forms—so to speak—an interior housing of the module housing. In this process, the air conduction element can be optimized with regard to the flow of air, in particular, in respect of its form or its cross section. The air conduction element can, in particular, be configured circularly or elliptically in the cross section. Irrespective thereof, the module housing can have another outer configuration, in particular, the module housing can substantially have flat external surfaces, which simplify the installation along normally flat vehicle structures, such as walls, claddings, floor and the like.

The air conduction element can have at least two of the following components or conduction sections:
  a first conduction section which is connected to the air inlet opening,
  a second conduction section which is connected to the air outlet opening, and
  a third conduction section which is housed between the first and second conduction sections and connected to them.

The conduction sections can be configured as pipe-like building components. In this process, each conduction section can be a stable building component in itself. The conduction sections can be connected to one another at their respective ends, and the conduction sections can, in particular, be configured in such a manner that the first conduction section and the second conduction sections are coupled to the third conduction section by means of a form-locking connection, such as a plug connection or snap-on connection. However, also other types of connection are conceivable, such as a threaded connection where a short external thread is provided on a conduction section and a corresponding internal thread on the other conduction section. Furthermore, if required, the conduction sections can also be connected to one another in a material-locking manner, for example, by bonding.

The first heating module can be configured as a heating installation with a heating element, which is configured for the heating of air that expedites the blower device. In the heating system, the first heating module can be an electric heating installation with a heating coil, as an example of the heating element, which is configured for the heating of air that expedites the blower device. In this process, the heating coil can be arranged within the third conduction section. An electric heating module can normally be installed in a very simple and space-saving manner since only a power connection must be provided. Furthermore, an electric heating installation as the heating module can also be easily integrated into an existing heating system. In this process, it is particularly advantageous that the heating module has air passively passed through it, i.e. the heating module itself does not have an installed blower.

The first conduction section of the air conduction element can have a plurality of deflectors, so that air conveyed by the blower device is deflected at the deflectors into certain directions upon entry into the first heating module and/or upon exit from the first heating module. The deflectors service, in particular, to distribute the conveyed air within the heating module or have the conveyed air flow within the heating module in such a manner that optimum heat transfer can occur in the area of the heating coil. Furthermore, the deflectors cause improved mixing of the air arriving at the heating module and subsequent more equal heating.

The heating system can have a second heating module, which is separate from the first heating module and which is upstream of the first heating module. This allows the use of the first heating module as an additional heating installation or as an alternative heating installation to the second heating module.

The second heating module and the blower device can be jointly housed within the second module housing. In this process, the second heating module and the blower device form a heating unit. Also, the second heating module and the blower device can form a kind of main heating installation within the heating system of the habitable vehicle, where the heating system can be supplemented by the first heating module as an additional or alternative heating installation.

The control device can be connected to the second heating module wirelessly or wired and is adapted to communicate with the second heating module. This enables that the first heating module can be operated in coordination with the second heating module. In this connection, the term "control device" is to be understood to the effect that it comprises a plurality of control units allocated, for example, to the heating modules, such as control boards, with these control units being in communication connection with one another. Furthermore, also an external device can belong to a control device, such as a mobile phone, a tablet computer or the like, on which a corresponding application for controlling the heating system is stored and can be executed. The external device can, for example, be connected to the control device or a control unit via a wireless radio connection.

In the heating system, the control device can be adapted to operate the heating system:
  exclusively with the first heating module and the blower device, or
  exclusively with the second heating module and the blower device, or
  with the first heating module and the second heating module combined and the blower device during a heating operation. This enables flexible use of the heating system. In this process, the operation of one or both heating modules can, in particular, depend on what amount of heat is required, or whether the habitable space is to be heated within a short time. Furthermore, in the case of larger habitable space, the heating modules can also be controlled dependent on their location in the habitable space, so that, for example, a living area is heated more than a sleeping area.

The second heating module can be an electric heating installation or a gas heating installation or a diesel heating installation (or, generally, a heating installation powered with fuel). In particular, the combination of a first heating module configured as an electric heating installation and of a second heating module configured as a gas or diesel heating installation, leads to more flexibility in operation. In this process, the heating system can, dependent on the source of energy available, be operated exclusively with gas or exclusively with electricity or in combination. The use of the electrical heating installation is, in particular, of advantage if the habitable vehicle is at the same place for a longer period of time, and if there is an external power connection. The use of the gas heating installation can be advantageous in the case of short residence times if there is no external power connection, or if the user does not wish that an external power connection is used.

In the heating system, the first module housing can be mountable or mounted on the second module housing by means of an adapter device. This enables assembly of the first heating module and the second heating module in a compact manner. Furthermore, the adapter device also enables retrofit of a heating system, for example, if the heating system initially only has a second heating module (with integrated blower) and is to be supplemented by a first heating module.

In the heating system, the first heating module and the blower device can be arranged spatially separate from one another and connected to one another, in terms of the airflow, by means of a pipe or a tube. In this connection, it is also conceivable that the first heating module and the second heating module (with integrated blower) can be connected to one another, in terms of the airflow, via a pipe or a tube connection. The design of the heating system with its modular components can thereby be made more flexible.

The heating system can have at least one system module arranged downstream of the first heating module, which is connected, in terms of the airflow, to the first heating module, with the system module being another pipe or a tube or an airflow divider or another blower device. This enables better distribution of the air heated within the first heating module to desired areas within the habitable space.

In the following text, the invention is described based on an embodiment with reference to the accompanying figures, in which:

FIG. 16 shows, in partial figures A) to C), a connection between a heating module and a pipe piece by means of a pipe adapter.

Figure 1:
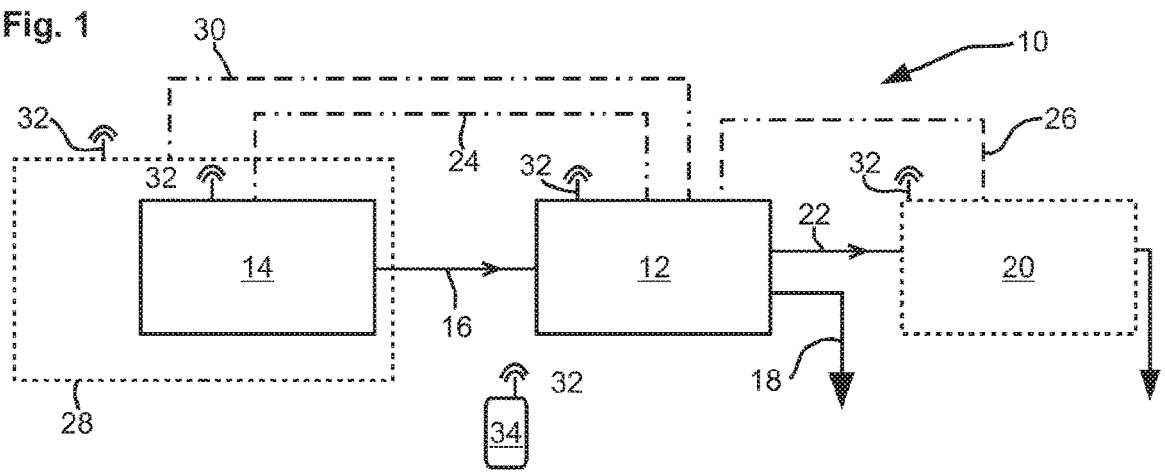
FIG. 1 shows a schematic diagram of a heating system.

FIG. 1 shows a diagram of a heating system 10 in a simplified and schematic manner. The heating system has a first heating module 12, which is connected to a separate blower device 14. The airflow connection 16 between the first heating module 12 and the blower device 14 is therein illustrated by a line only. Air to be heated is conveyed from the blower device 14 to the first heating module 12 by means of the line 16. The air is heated within the first heating module 12 and then exits from the first heating module 12 again. In this process, the heated air can directly exit from the first heating module 12 into the habitable space, as symbolized by arrow 18. Alternatively, the first heating module 12 can be connected downstream with another component 20 of the heating system 10, with the connection being symbolized therein by another arrow 22.

The additional component 20 can, for example, be a distributor, another blower device or a pipe or tube. It is also conceivable that not only one additional component 20 is connected thereto, but a plurality of components.

In particular, it is conceivable to provide, as additional components, another blower device 14 and another (first) heating module 12, so that the blower device 14 and the first heating module 12 shown therein are followed by a blower device 14 and a first heating module 12 again, which, for the sake of simplicity, are shown therein as additional components 20.

The first heating module 12 and the blower device 14 have a communication connection 24 shown as a dash-dotted line. A communication connection 26 can also exist between the first heating module 12 and the additional component 20.

The blower device 14 can be part of a second heating module 28. In particular, it is conceivable that the second heating module 28 and the blower device 14 form an integrated heating installation. In this embodiment, a communication connection 30 can also be provided between the first heating module 12 and the second heating module 28. Settings of the heating system 10 can, for example, be made on the first heating module 12 and/or on the second heating module 28, in particular, on corresponding control devices (not shown).

It is also conceivable that the first heating module 12 and/or the blower device 14 and/or the second heating module 28 and/or the additional component(s) 20 have a wireless communication interface 32. The various modules or components of the heating system 10 can exchange (control) data among themselves by means of wireless communication interfaces 32. Furthermore, it is also conceivable to control the modules or components by means of a wireless remote control 34 of the heating system 10. The remote control 34 can, for example, be realized in the form of an application on a mobile phone or a tablet computer. It goes without saying that also the remote control 34 has a communication interface 32. For example, a WLAN or Bluetooth connection can serve as the wireless communication connection. With regard to the communication connection, it is also conceivable that, for example, the first heating module 12 or the second heating module 28 can be controlled by means of the wireless communication connection, and other modules or components of the heating system 10 can be controlled by means of cable-bound connections, such as lines 24, 26, 30.

Figure 2:
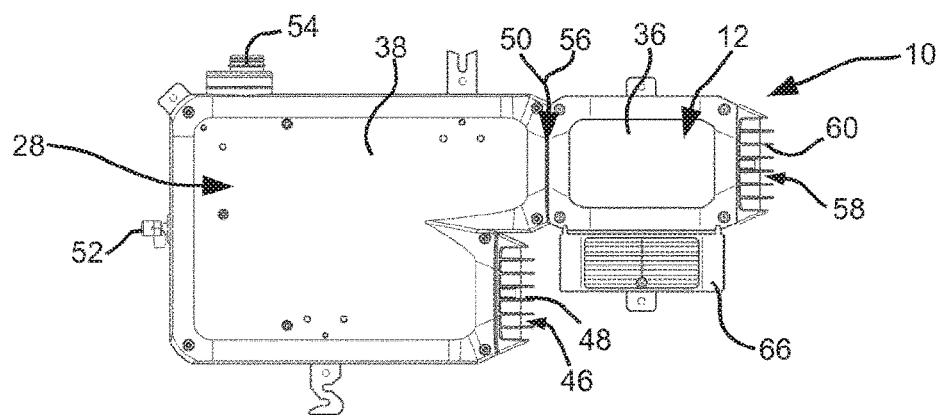
FIG. 2 shows an embodiment of a heating system with a first heating module and a second heating module.

FIG. 2 shows, in a schematic top view, an embodiment of a heating system 10 with the first heating module 12 and the second heating module 28. The first heating module 12 has a first module housing 36. The second heating module 28 has a second module housing 38. In the example shown, the first heating module 12 and the second heating module 28 are directly connected to one another.

Figure 3A:
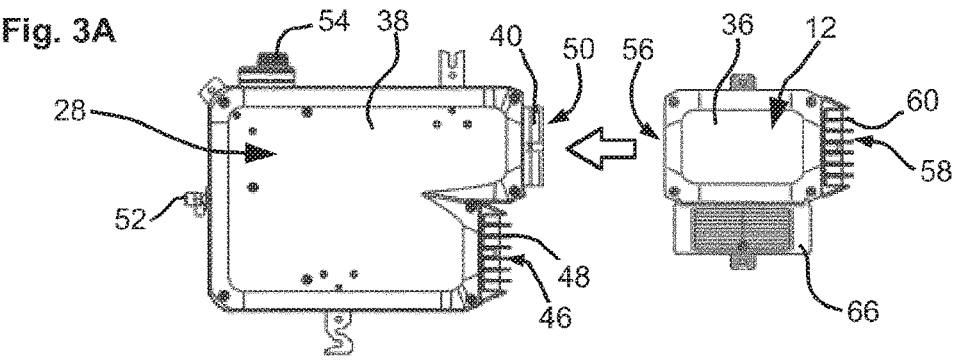
FIG. 3 shows, in partial figure A), a connection of the first heating module and of the second heating module by means of an adapter device and, in partial figure B), by means of an air conducting pipe or tube.

As can be seen from FIG. 3A, the first heating module 12 and the second heating module 28 can be connected to one another by means of an adapter device 40. FIG. 3A shows the non-connected state of the two heating modules 12, 28. FIG. 2 shows the connected state when the first heating module 12 has been plugged onto the adapter device 40 in accordance with the direction of the arrow in FIG. 3A. In an alternative embodiment, the first heating module 12 and the second heating module 28 have matching mechanical interfaces (or, generally, contact areas) for discharging or supplying air, so that they can be directly connected to one another.

Figure 3B:
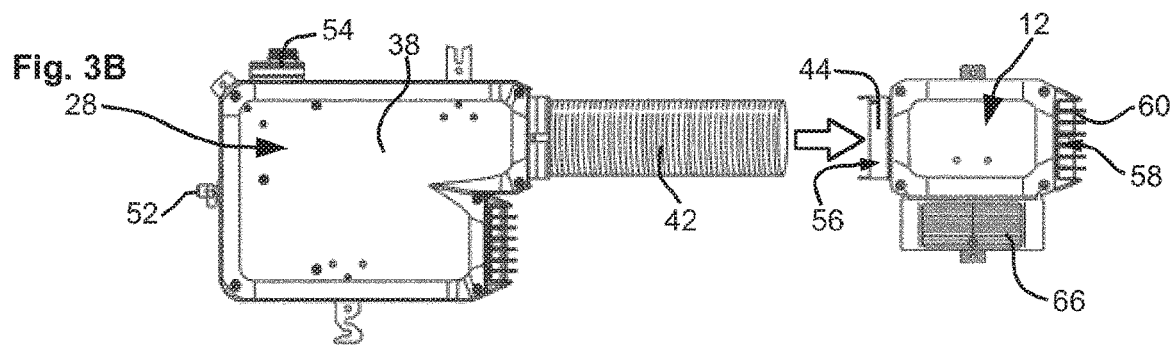

FIG. 3B shows the possibility that an airflow connection in the form of a pipe or a tube 42 is possible between the first heating module 12 and the second heating module 28. For this purpose, the first heating module 12 has a pipe adapter 44, into which the pipe or the tube 42 can be inserted and mounted.

It is pointed out that the second heating module 28 shown in FIGS. 2 and 3 has a blower device which cannot be seen in these figures. Air is conveyed from the second heating module 28 to the first heating module 12 by means of the blower device. Furthermore, it is pointed out that, instead of the second heating module 28, only a blower device (without a heating function) could be connected to the first heating module, as schematically shown in FIG. 1 and explained above.

The second heating module 28 can, for example, be a heating installation, which is operated with gas or with diesel or electrically. The first heating module 12 is preferably an electrically operated heating installation. The second heating module 28 shown therein has an air inlet opening 46 within its second module housing 38. The air inlet opening 46 is covered by a safety guard 48. Air sucked into the second heating module 28 is circulated within the second heating module 28 (by means of the blower device which cannot be seen) and heated (by means of a gas burner which cannot be seen) and then exits at an air outlet opening 50 again. The second heating module 28 can also be operated to circulate air only, without heating the air therein. For the sake of completeness, it is pointed out that a gas connection 52 is provided on the second heating module 28. Furthermore, the second heating module 28 has an exhaust gas outlet 54 where exhaust gases can exit following the combustion of gas or can be discharged via an exhaust gas line not shown therein.

The first heating module 12 has an air inlet opening 56 and an air outlet opening 58 on its first module housing 36.

In the case of FIG. 2 or 3B, the air inlet opening 56 is arranged directly opposite to the air outlet opening 50 of the second heating module by means of the adapter device 40 if the two heating modules are connected to one another. In the example of FIG. 3B, the tube or the pipe 42 extends between the air outlet opening 50 of the second heating module 28 and the air inlet opening 56 of the first heating module 12. The pipe adapter 44 is arranged at the air inlet opening 56. The first heating module 12 has a safety guard 60 in the area of its air outlet opening 58.

The heating system 10 can be operated in such a manner that air conveyed by the blower device 14 (FIG. 1) is only heated by the first heating module 12. Alternatively, the heating system 10 can be operated in such a manner that air conveyed by the blower device 14 is heated by the second heating module 28 only. Finally, it is also possible to operate the heating system 10 in such a manner that air conveyed by the blower device 14 is heated both within the second heating module 28 and within the first heating module 12.

As can, in particular, be seen from FIGS. 2 and 3, the first heating module 12 can be used as an additional or supplementary heating installation to the second heating module 28. Taking into account that the second heating module 28 is, in the example shown, a gas heating installation and the first heating module 12 an electric heating installation, heating operation of the heating system 10 can optionally be with gas or with electricity or combined. The operation of the first heating module 12 is, in particular, suggested if the habitable vehicle is connected to an external power connection. In a combined heating operation of the first heating module 12 and the second heating module 28, the control of the two heating modules can also be set in such a manner that the respective consumption of gas or electricity is optimized. This can, in particular, be effected taking into account parameters such as the external temperature, the current internal temperature, the internal temperature to be reached or similar. Also, a kind of quick heating operation is, for example, conceivable where the two heating modules are operated matched to one another in such a manner that a heating performance of the heating system 10 is achieved, which heats the habitable space to a desired internal temperature within a minimum period of time.

Figure 4:
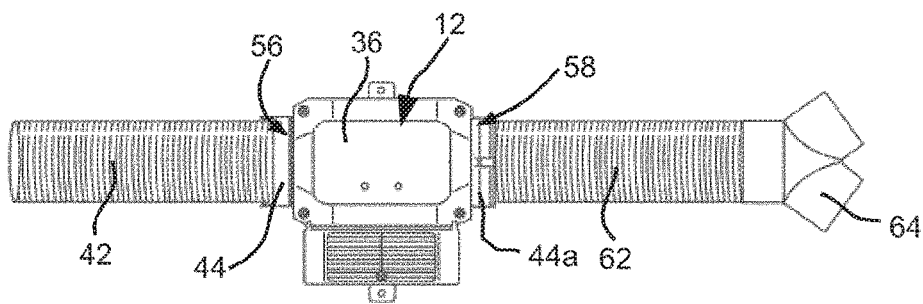
FIG. 4 shows the first heating module with an additional pipe or tube for the distribution of heated air.

In FIG. 4, the first heating module 12 with the pipe or tube connection 42 known from FIG. 3B is shown as part of a heating system 10. In this process, the tube connection 42 contacts the air inlet opening 56 of the first heating module 12 via the pipe adapter 44. Instead of the safety guard 60, another pipe adapter 44a is arranged within the area of the air outlet opening 58. Another pipe or tube-shaped connection line 62 is connected to this pipe adapter 44a. The pipe or the tube 62 has a distribution element 64 downstream where the airflow can exit in various directions or be passed on if another pipe or tube-type connection element should be connected to the distribution element 64. The connection line 62 and/or the distribution element 64 can also be referred to as additional components of the heating system, which are subsumed as additional components 20 in the schematic FIG. 1.

Furthermore, it can be seen from FIGS. 2 to 4 that an additional housing 66 is provided on the module housing 36 of the first heating module 12. The additional housing 66 serves to house electronic building components which cannot be seen in these figures, which are primarily set to control the first heating module 12.

In the following text, with reference to FIGS. 5 to 10, the first heating module 12 which can be inserted into the heating system 10 is described in more detail. If the term "heating module" is used alone in the following text, then this always means the "first heating module" of the heating system in the context of this application. In this respect, the properties and features of the heating module 12 can, in the following text, also be understood as further developments of the aforedescribed first heating module 12 of the heating system 10.

Figure 5:
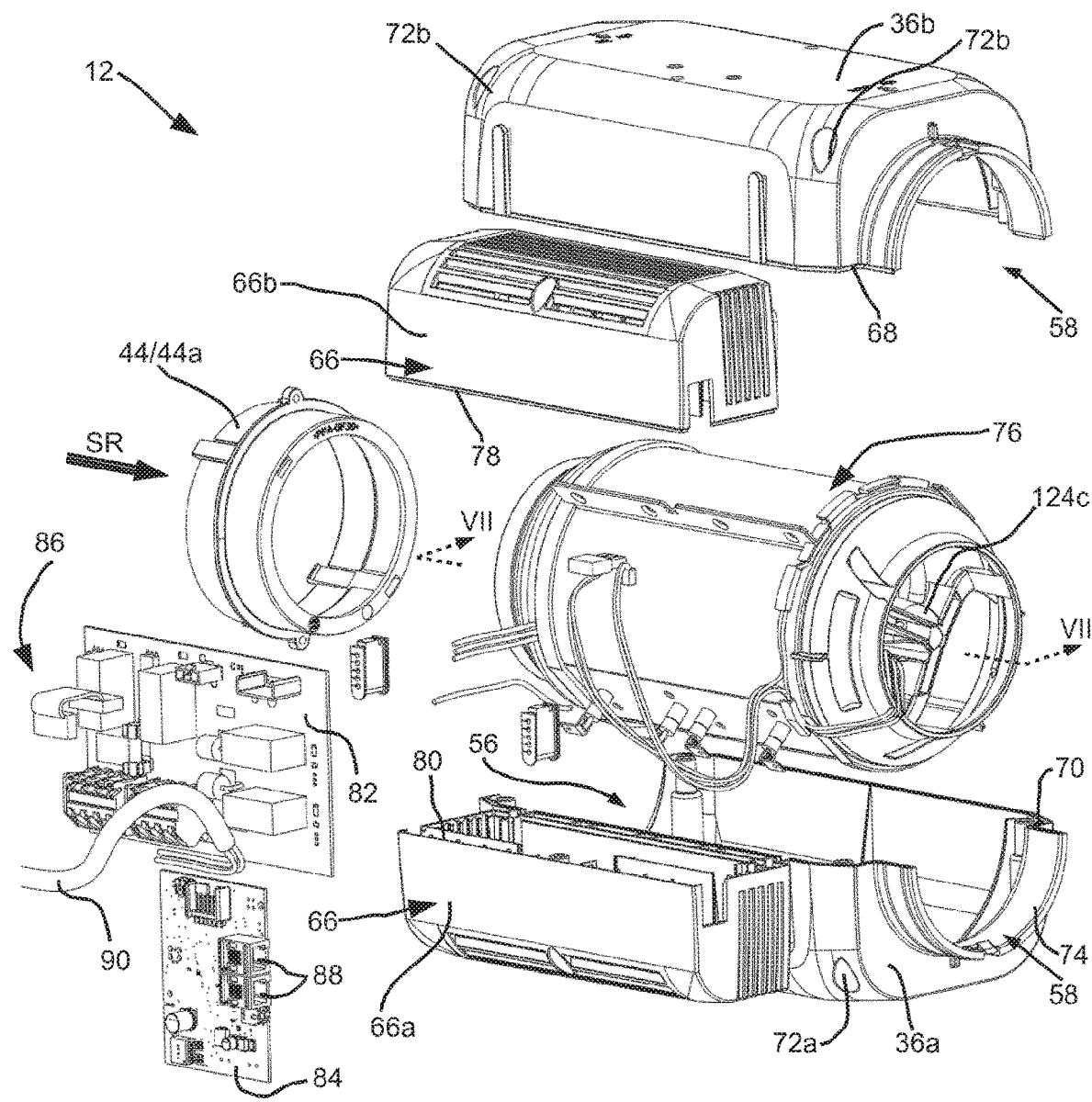
FIG. 5 shows a perspective exploded view of a (first) heating module.

FIG. 5 shows the heating module 12 in a perspective exploded view. The (first) module housing 36 has a lower half shell 36a and an upper half shell 36b. The two half shells 36a, 36b are, in particular, form-fittingly connectable to one another. For this purpose, the upper half shell 36b has a circumferential spring 68, and the lower half shell 36a has a groove 70. The two half shells 36a, 36b are, in the connected state, secured by means of screws not shown. In this regard, reference is made to corresponding screw openings 72a and 72b provided in the respective half shells 36a, 36b.

FIG. 5 allows a view of the air outlet opening 58 of the first module housing 36. The module housing 36 has a substantially circular flange 74 in the area of the air outlet opening 58. The safety guard 60 shown in FIGS. 2 and 3 can be mounted on this flange 74. Furthermore, a pipe adapter 44a shown in FIG. 4 can be connected to the flange 74. The air inlet opening 56 of the module housing 36 can be partly seen in the area of the lower half shell 36a. Also, a front side 124c of a displacement element to be described in more detail later, which deflects air to a sensor device, can be recognized.

An air conduction element 76 is housed within the (first) module housing 36. The air conduction element 76 forms some sort of interior housing, through which the air to be heated flows along the direction of a main flow SR. A pipe adapter 44 or 44a is, by way of example, shown upstream of the airflow element 76, which is, in particular, adapted to connect a pipe or a tube 42 or 62 (FIG. 4) to the (first) heating module 12.

As already mentioned with reference to FIGS. 2 to 4, an additional housing 66 is arranged on the (first) module housing 36. The additional housing can also be formed by a lower half shell 66a and an upper half shell 66b. The two half shells 66a, 66b of the additional housing 66 are also form-fittingly connectable to one another. For this purpose, the upper half shell 66b has a spring 78, and a groove 80 is provided on the lower half shell. The additional housing 66 is adapted to house printed circuit boards 82, 84. The two printed circuit boards 82, 84 form a control device 86 of the (first) heating module 12. For example, two sockets 88 can be seen on the printed circuit board 84. For example, cable connections 24, 26, 30 for communication to other components of the heating system 10 (see FIG. 1) can be connected to these sockets 88. An electric cable 90 is shown between the two printed circuit boards 82, 84 in a schematic and simplified manner. This cable 90 serves, in particular, the power supply of the (first) heating module 12 or of one (or more) heating coils arranged therein as an exemplary embodiment of the heating element, which cannot be seen in the figure as it is housed within the air conduction element 76.

Figure 6:
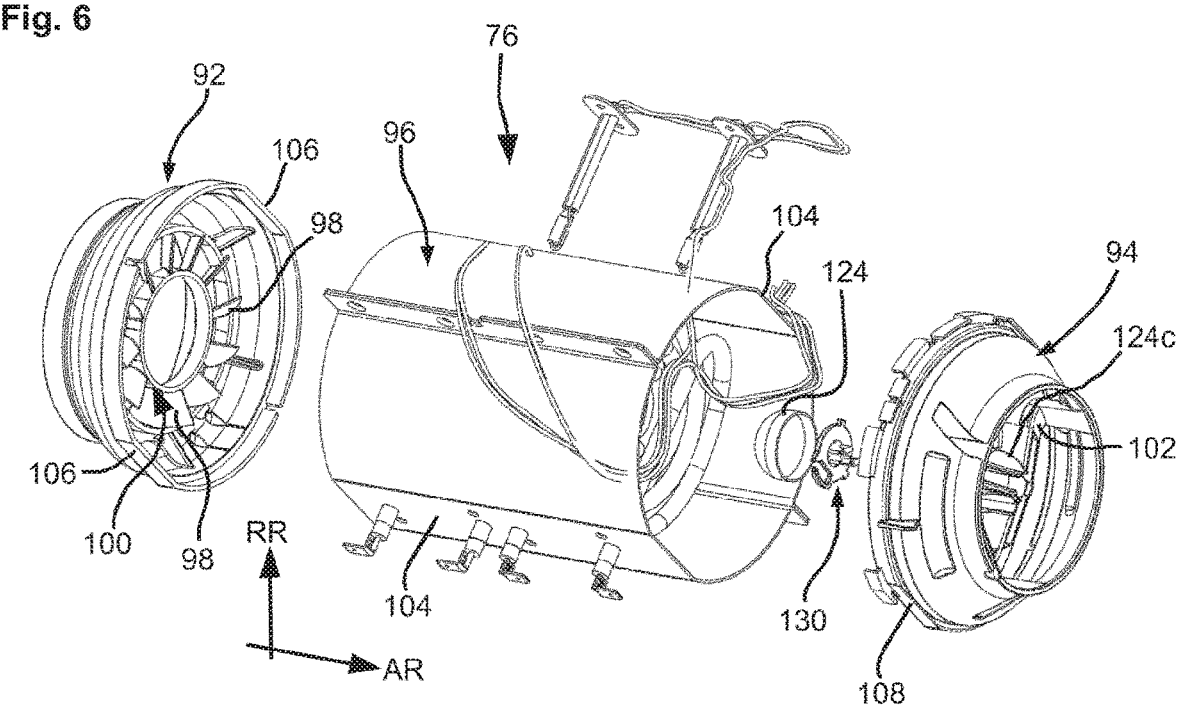
FIG. 6 shows a perspective exploded view of an air conduction element of the (first) heating module of FIG. 5.

FIG. 6 shows the air conduction element 76 in a perspective exploded view similar to FIG. 5. In this example, the air conduction element 76 is formed by a first conduction section 92, a second conduction section 94, and a third conduction section 96. The first conduction section 92 is, in the assembled state of the (first) heating module 12, arranged within the area of or, related to the direction of flow SR, shortly behind the air inlet opening 56. The second conduction section 94 is, in the assembled state of the (first) heating module 12, arranged within the area of or, related to the direction of flow SR, shortly before the air outlet opening 58.

The first conduction section 92 has a plurality of deflectors 98. The deflectors 98 are therein arranged along a circle and together form a deflecting collar 100. The deflectors 98 have, related to an axial direction of the air conduction element 76 parallel to the direction of flow SR, a bent or curved shape. One can also designate the deflectors 98 as some sort of turbine blades. The deflectors 98 are firmly connected to the first conduction section 92, in particular, formed in one piece as an integral building component.

The second conduction section 94 has a plurality of bars 102 which, related to a radial direction RR, extend from radially outside to radially inside. The bars 102 are firmly connected to the second conduction section 94, in particular, formed in one piece as an integral building component. Here, too, the front side 124*c* of the displacement element 124 for the sensor device 130 must be taken into consideration.

The third conduction section 96 is housed between the first conduction section 92 and the second conduction section 94. The first conduction section 92 and the second conduction section 94 are pluggable onto the third conduction section 96. The third conduction section 96 has a substantially circular flow cross section. However, the circular form has two opposite flat sections 104. Corresponding flat sections 106, 108 can also be seen on the first conduction section 92 or on the second conduction section 94. In the assembled state of the air conduction element 76, the flat sections 104, 106, 108 also serve as some sort of protection of the form-fitting plug connection, so that the conduction sections 92, 94, 96 cannot twist relative to one another.

Figure 7:
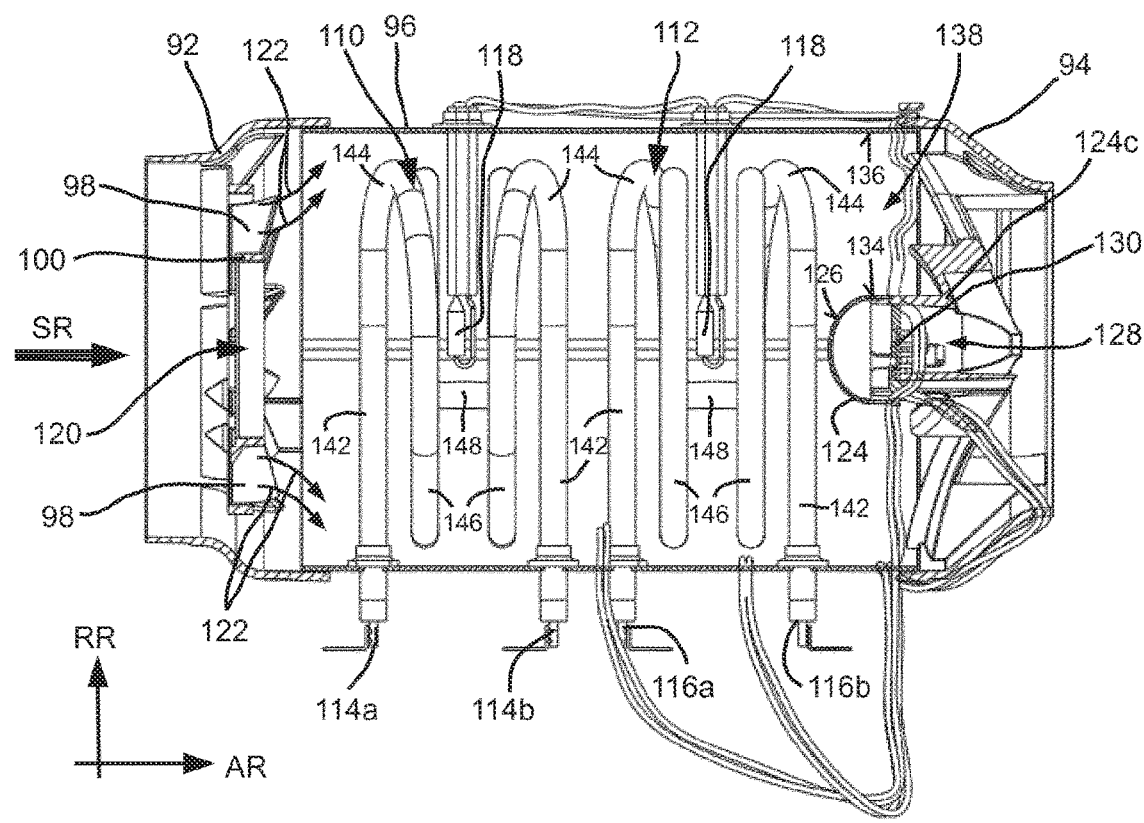
FIG. 7 shows a longitudinal section view of the (first) heating module of FIG. 5 approximately corresponding to a section line VII-VII of FIG. 5.

The air conduction element 76 is in FIG. 7 shown in a longitudinal section view, which approximately corresponds to a section line VII-VII of FIG. 5. The first conduction section 92, the second conduction section 94, and the third conduction section 96 can be seen in the assembled state. In FIG. 7, air enters the first conduction section 92 from the left-hand side in accordance with the direction of the main flow SR and passes through the air conduction element 76 until it exits again at the second conduction section 94.

Two heating coils 110, 112 are arranged within the third conduction section 96. In the present example, the two heating coils 110, 112 are successively arranged in the direction of flow SR or in the axial direction AR. The heating coils are mounted on a lower flat section 104 of the third conduction section 96. Each heating coil 110, 112 has two electrical connections 114*a*, 114*b* or 116*a*, 116*b* arranged outside the third conduction section 96. A safety fuse 118 is arranged within the area of each heating coil 110, 112. The safety fuses 118 serve, in particular, to prevent overheating of the heating coils 110, 112.

Also, the deflectors 98 on the first conduction section 92 can be seen from the sectional view of FIG. 7. The deflecting collar 100 has a central opening 120, through which also air can flow. Air, which flows into the area of the deflectors 98, is, in particular, directed radially outwards, so that substantially the entire flow cross section formed by the third conduction section 96 can be used. This is illustrated by the short arrows 122.

Furthermore, a displacement element 124 with a front side 124*c* is arranged within the flow cross section of the air conduction element 76. The displacement element 124 is adapted to displace the air radially outwards, and the front side 124*c* also enables the return of the air to the sensor device 130. It has a side or surface 126 facing the direction of flow SR, which is configured bent or curved. In particular, the side 126 facing the flow SR is configured spherical in shape, in particular, as a spherical calotte or hemisphere, or as a paraboloid. In the present example, the displacement element 124 serves as a cover for a housing space 128 of a sensor device 130. The housing space 128 (sensor holder) is provided within a central area of the second conduction section 94. In one embodiment, the displacement element 124 can be an integral part of the second conduction section 94.

The sensor device 130 is adapted to record the temperature of the heated air. The struts 102 of the second conduction section 94 (cf. the subsequent FIG. 10) have air conduction channels 132, which are adapted to direct heated air from the main flow in the direction of the housing space 128 and of the sensor device 130 arranged therein. Hence, the sensor device 130 is not subjected to the main flow of the heated air, but measures the temperature of a portion of the air branched off or taken from the main flow. This, in particular, also ensures that a mean temperature is measured, which corresponds as precisely as possible to that temperature, which the air has when it exits from the (first) module housing 36 (FIGS. 2 to 5). The displacement element 124, in particular, its external side 134, and the interior side 136 of the air conduction element 76, in particular, of the third conduction section 96, restrict an annular flow channel section 138.

Figure 8:
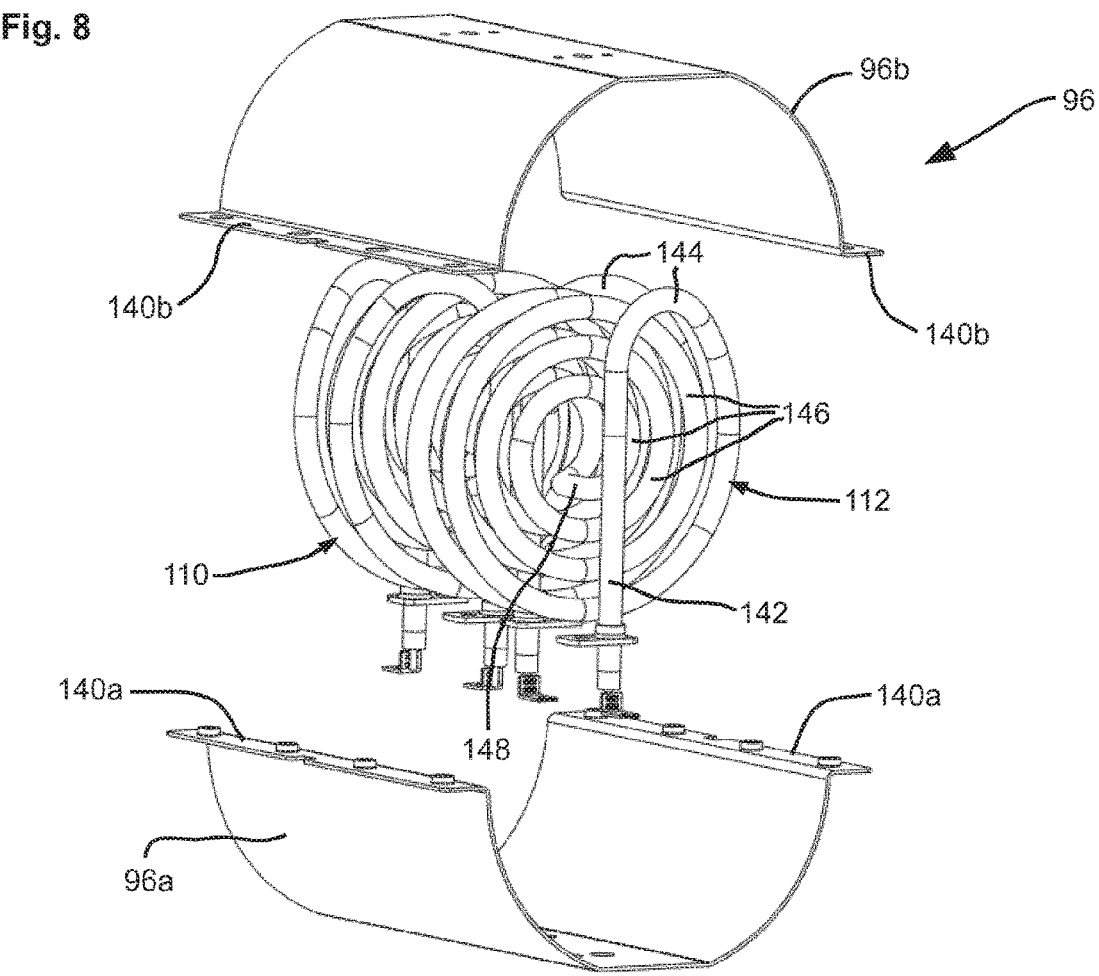
FIG. 8 shows a perspective exploded view of a third conduction section and of heating coils of the (first) heating module of FIG. 5.

FIG. 8 shows a perspective exploded view similar to FIGS. 5 and 6 of the third conduction section 96 and the heating coils 110 and 112 arranged therein. It can be seen from the view that the third conduction section 96 can be formed by two substantially semicircular partial profiles 96*a*, 96*b*. Both partial profiles have respective flange sections 140*a*, 140*b*, on which the two partial profiles 96*a*, 96*b* can be connected to one another.

Also, the shape of the two heating coils 110, 112 can be seen from a review of FIGS. 7 and 8. Each heating coil 110, 112 has two substantially straight connection sections 142. In each case, a transition section 144 is connected to the connection section 142. Based on the transition section 144, a plurality of windings 146 can then be seen, which spirally merge into one another. The spiral windings 146, in particular, those windings with the smallest radius or diameter, are connected radially inside by a transversal section 148 running along the axial direction AR.

Figure 9:
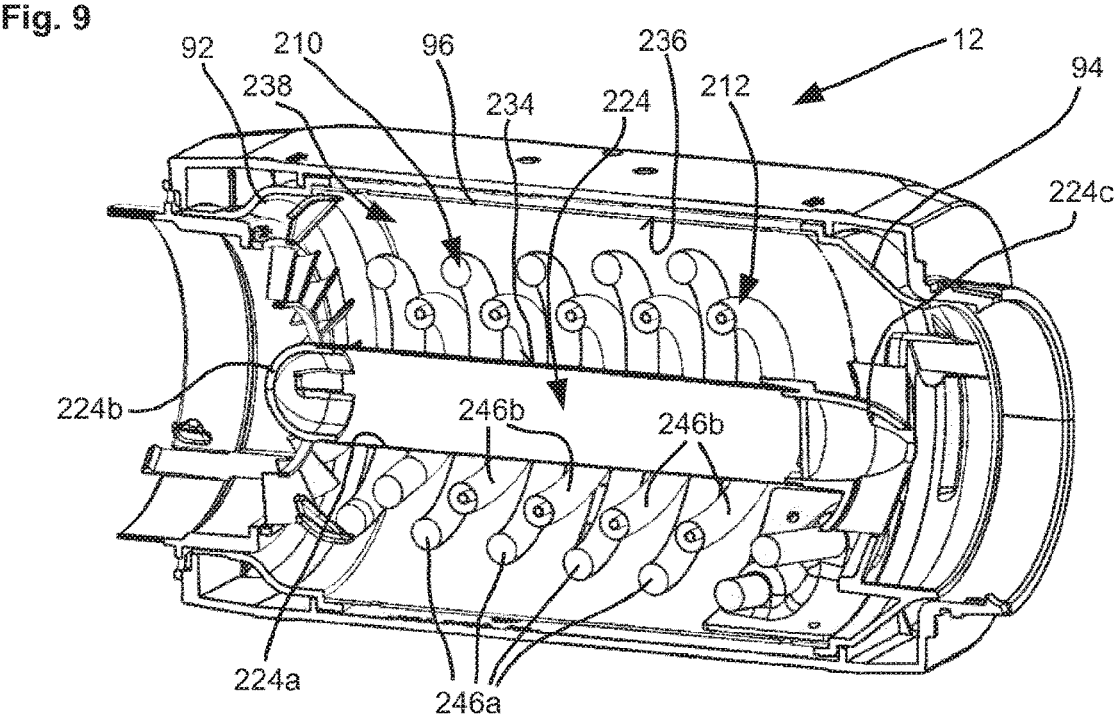
FIG. 9 shows a partially cut perspective view of an alternative embodiment of the (first) heating module.

FIG. 9 shows, in a perspective partial sectional view, an alternative embodiment of the (first) heating module 12. In this process, the heating module 12 has a displacement element 224, which extends substantially over the entire length of the air conduction element 76. In particular, the displacement element 224 has a central section 224*a*, which is directly connected to the first conduction section 92 and to the second conduction section 94. A hemispherical cover element 224*b* is provided within the area of the first conduction section 92. The front side 224*c* is opposite to the cover element 224*b*. Prior to entering the third conduction section 96, incoming air is thereby multi-directionally displaced radially outwards and, in particular, also air for the measurement by the sensor device is supplied. The flow cross section of the air conduction element 76 is configured annularly over substantially the entire length. In this process, the annular flow channel 238 is restricted by the external side 234 of the displacement element 224 and by the interior side 236 of the air conduction element 76.

Also, an alternative arrangement of two heating coils 210, 212 can be seen from FIG. 9. The first heating coil 210 has a plurality of windings 246*a* following one another helically.

The second heating coil 212 has a plurality of windings 246b following one another helically. The two heating coils 210, 212 are arranged along the axial direction AR in such a manner that their windings 246a, 246b alternate. In each heating coil 210, 212 the respective windings 246a and 246b are configured in such a manner that their diameter becomes larger along the direction of flow.

Figure 10:
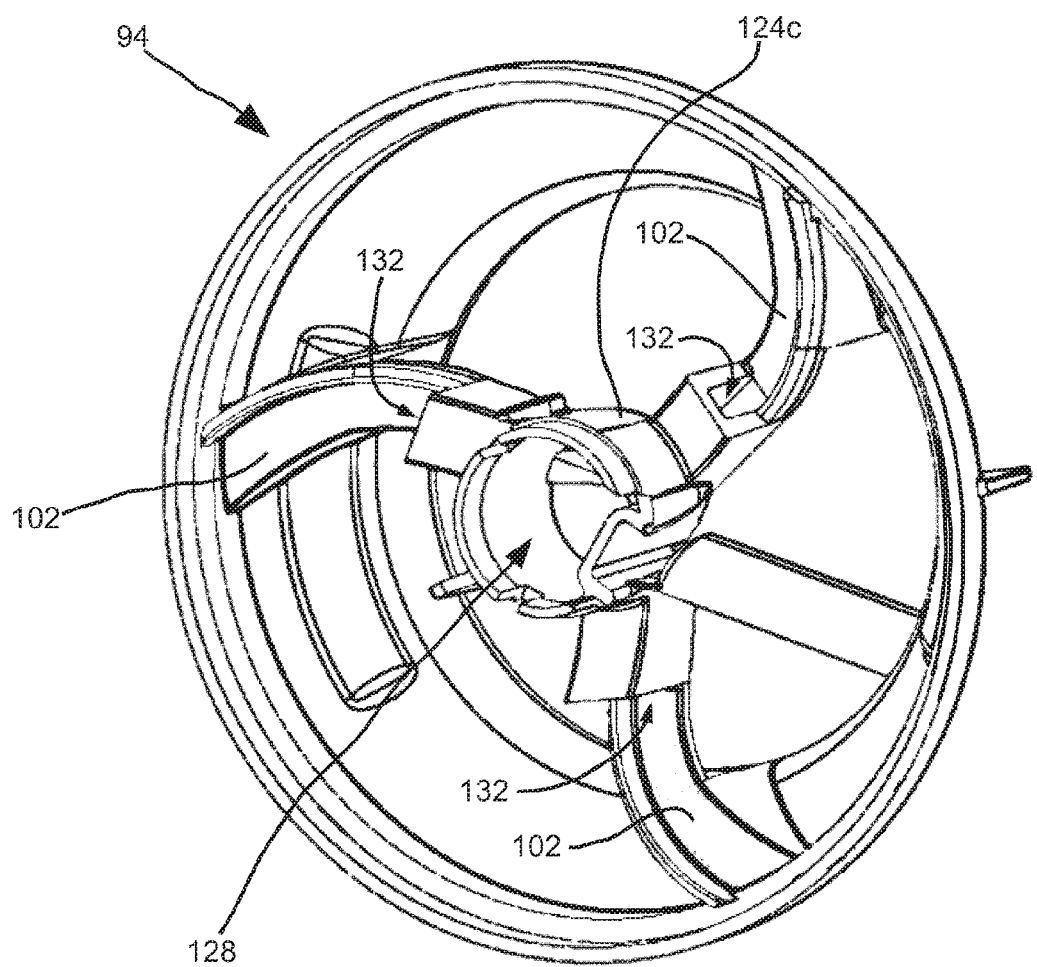
FIG. 10 shows a perspective view of a second conduction section, where the (interior) side facing the flow can be seen.

FIG. 10 shows a perspective view of the second conduction section 94. A look is made at the side facing the third conduction section 96 (FIGS. 6 and 7). As already mentioned, a plurality of struts 102 are arranged on the second conduction section 94. In the present example, three struts 102 are shown. However, the number of struts 102 is not restricted to three; also only two struts or more than three struts can be provided. Furthermore, the housing space 128 for the sensor device 130 not shown therein (FIGS. 6 and 7) can be seen from this view. An air conduction channel 132 adapted to redirect or branch off heated air in the direction of the housing space 128 is provided on each strut 102. A portion of the air is thereby branched off from different areas of the airflow and directed to the sensor device 130 (FIGS. 6 and 7). A good mixing of air from the airflow is thereby achieved, so that the temperature of a mixed air portion is measured. This allows the determination or recording of an average temperature which, in particular, corresponds as precisely as possible to the temperature upon exit from the (first) heating module 12. Also, the front side 124c of the displacement element is shown, which serves to supply deflected air to the sensor device.

In the embodiments shown, the displacement element 124, 224 and the sensor device or the sensor element 130 are in each case located along the longitudinal axis of the first heating module 12. This axial arrangement also relates to the safety fuses 118 of the variant in FIGS. 6 and 7.

Figure 11:
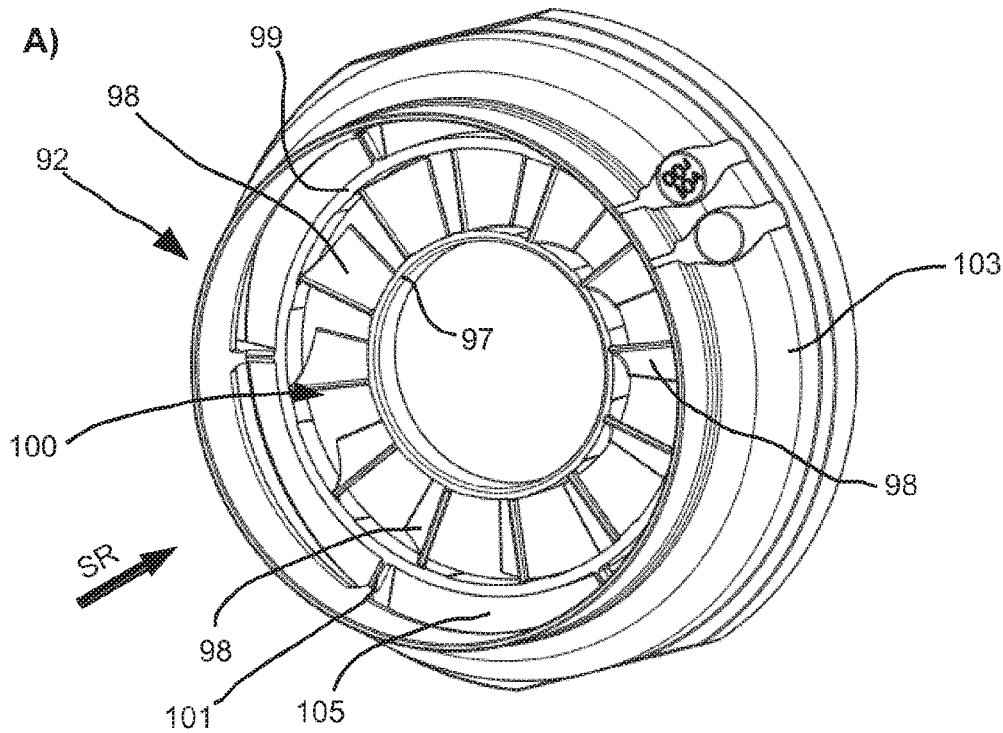
FIG. 11 shows, in partial figures A) and B), perspective views of a conduction section with a plurality of deflectors within a deflecting collar.
Figure 11:
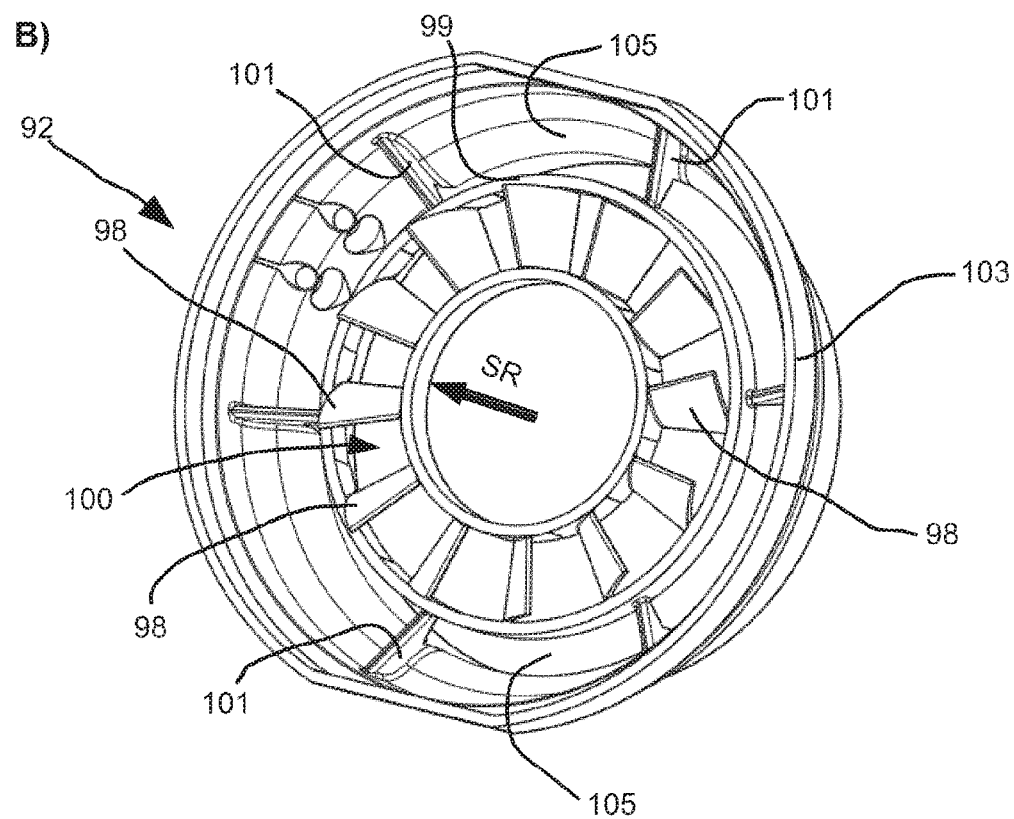

FIG. 11 shows the first conduction section 92 with the deflectors 98 arranged along a circle. In this process, FIG. 11A shows the (outer) side facing the flow or direction of flow SR, and FIG. 11B the (inner) side of the first conduction section 92 facing away. The deflectors 98 are connected together with a circular or annular basis 97. The annular basis 97 is also part of the deflecting collar 100 formed by all deflectors 98. The deflectors 98 are surrounded radially outside by another ring element 99. The radially outer ring element 99 is connected to a circumferential sleeve 103 of the first conduction section 92 by means of bars 101. As can be seen from both views, the deflectors 98 have a blade-like profile. Ring sector shaped air passages 103 are each formed radially outside between two adjacent bars 101. As already mentioned above, the first conduction section 92 is preferably integrally formed with the deflectors, in particular, the first conduction section 92 can, as an injection-molded part, be made from plastic. Depending on the design of the system component with which the first conduction section 92 comes into contact, or dependent on the design of an adapter device, etc. possibly used, the air passages 105 can also be closed by the components, the adapter device, the end area of a pipe, etc.

Figure 12:
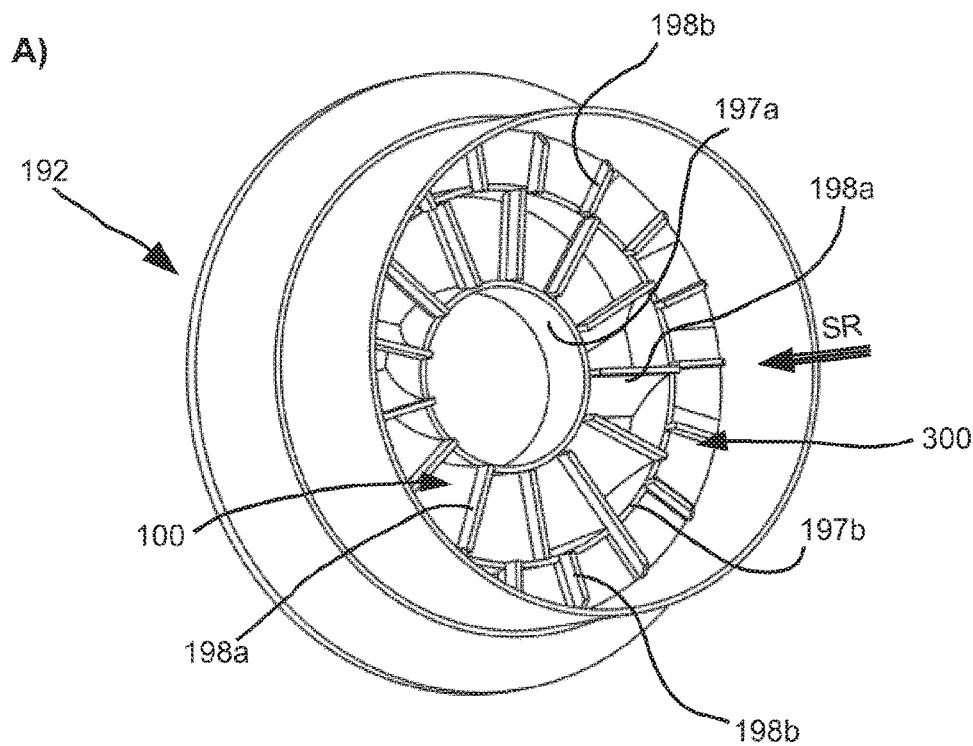
FIG. 12 shows, in partial figures A) and B), perspective views of a conduction section with a plurality of deflectors within two deflecting collars.
Figure 12:
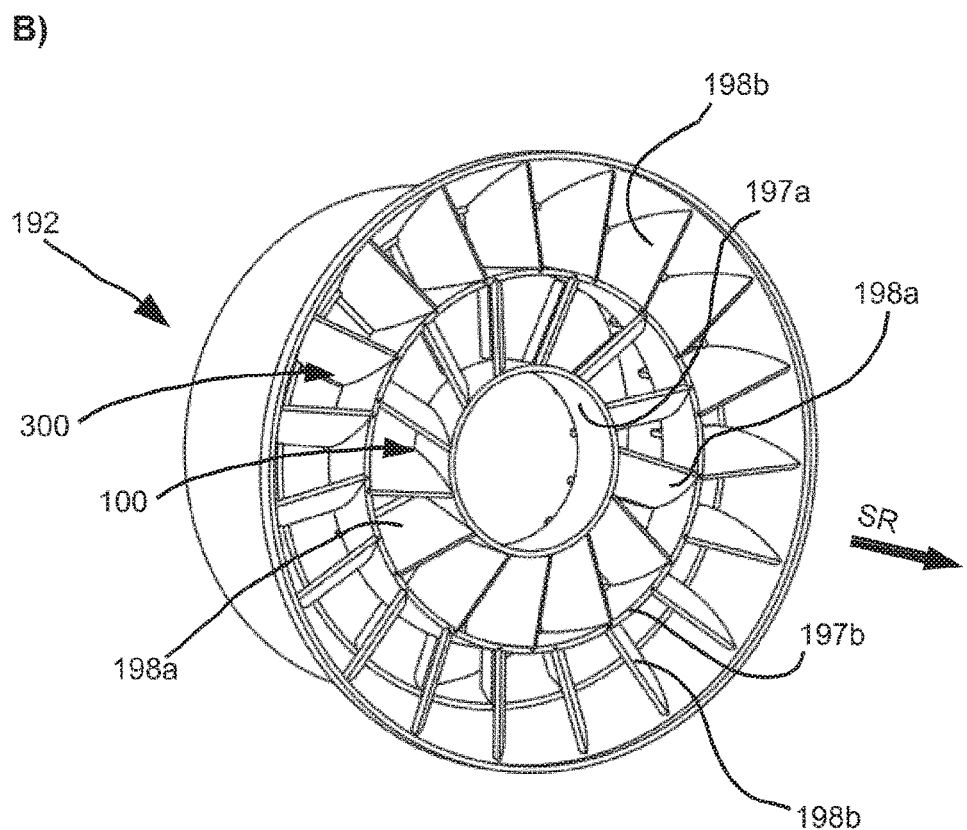

FIG. 12 shows a simplified conduction section 192 with deflectors 198a and 198b arranged along two substantially concentric circles. In this process, FIG. 12A shows the (outer) side facing the flow or direction of flow SR, and FIG. 12B the (inner) side of the conduction section 192 facing away. In this process, radially inner deflectors 198a redirect incoming air into another direction than the radially outer deflectors 198b. The inner deflectors 198a are arranged along an annular basis 197a. The outer deflectors 198b are arranged along an annular basis 197b. In this example, the radially inner deflectors 198a form a first deflecting collar 100. The radially outer deflectors 198b form a second deflecting collar 300. It is pointed out that the conduction section 192 shown in FIG. 12 can, for example, also be inserted into a heating module 12 instead of a first conduction section 92 shown in the previous FIGS. 6 and 11. In the conduction section 192 shown in FIG. 12, in particular, constructive designs located further radially outside are omitted or not shown, even if corresponding adaptations or constructive designs may be required for installation in a heating module 12.

Figure 13:
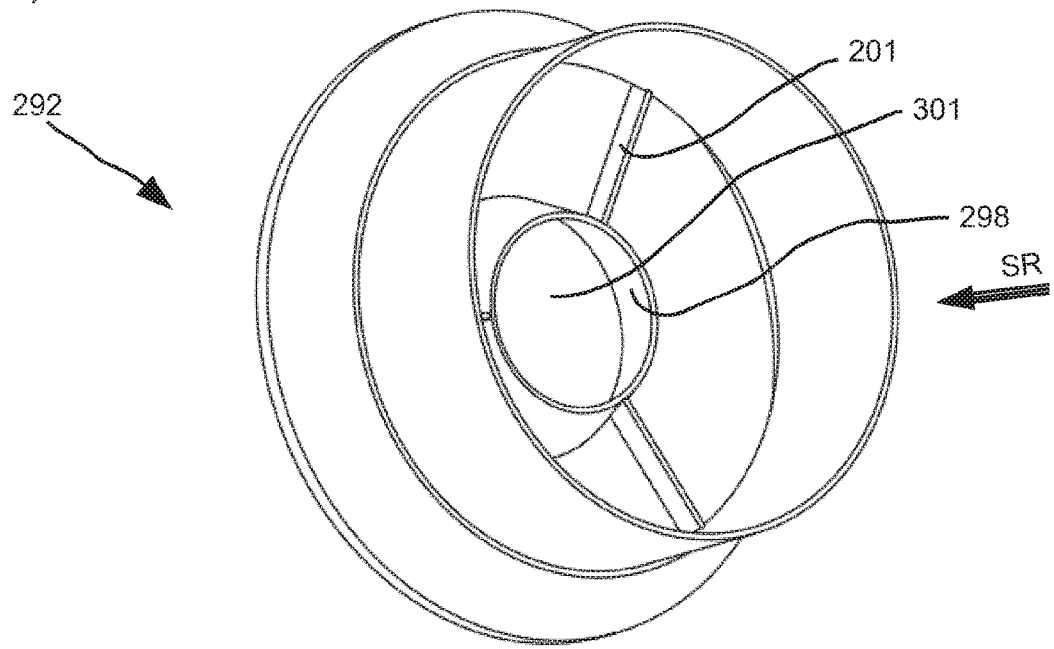
FIG. 13 shows, in partial figures A) and B), perspective views of a conduction section with an annular deflector.
Figure 13:
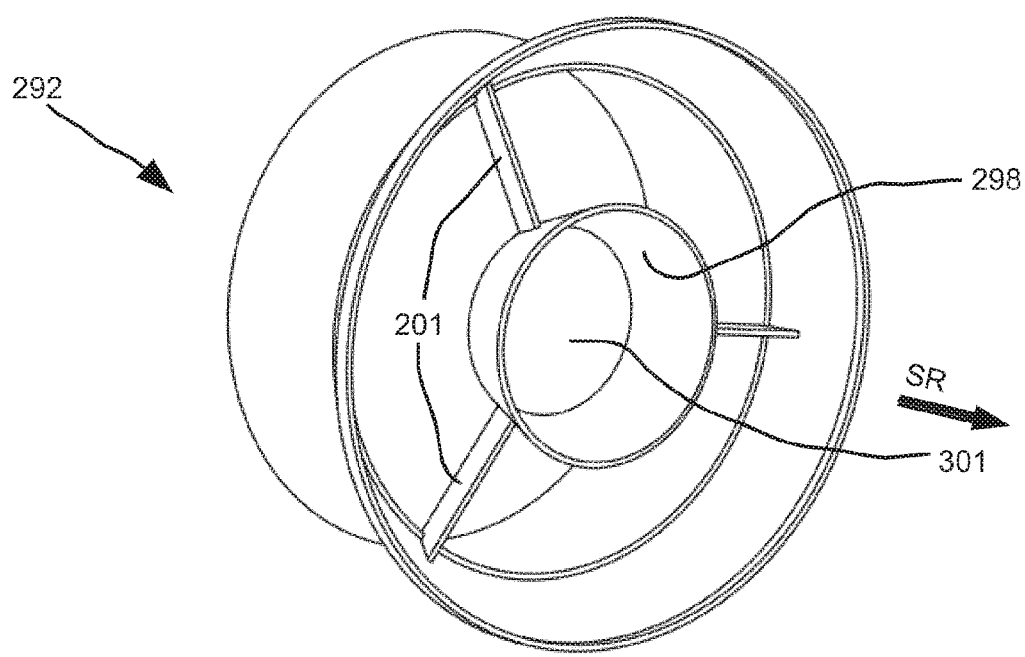

FIG. 13 shows a simplified conduction section 292 with a deflector 298 configured as a conic ring. The annular deflector 298 is held by a plurality of struts 201 in a central or centric area of the flow cross section. Due to the conic design of the annular deflector 298, incoming air is displaced radially outwards. Free space or a recess 301 is provided inside the deflector 298, through which the air can flow substantially unhindered in the axial direction. It is pointed out that the conduction section 292 shown in FIG. 13 can, for example, be inserted into a heating module 12 instead of a first conduction section 92 shown in the previous FIGS. 6 and 11 or a conduction section 192 shown in FIG. 12. In the conduction section 292 shown in FIG. 13, in particular, constructive designs located further radially outside are omitted or not shown, even if corresponding adaptations or constructive designs may be required for installation in a heating module 12.

Figure 14:
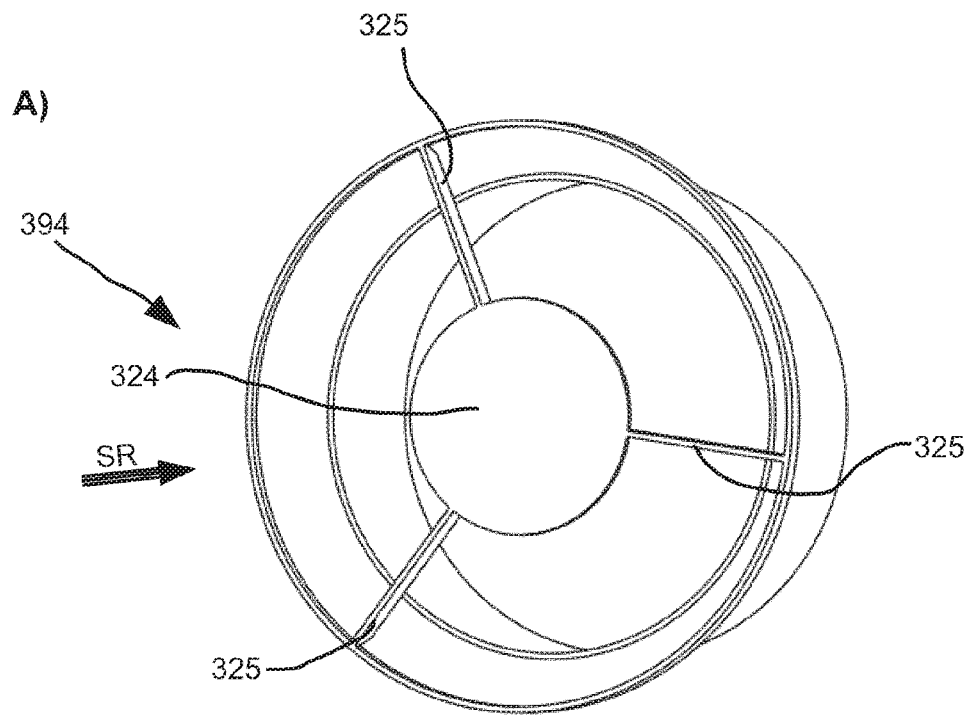
FIG. 14 shows, in partial figures A) and B), perspective views of a conduction section with a displacement element.
Figure 14:
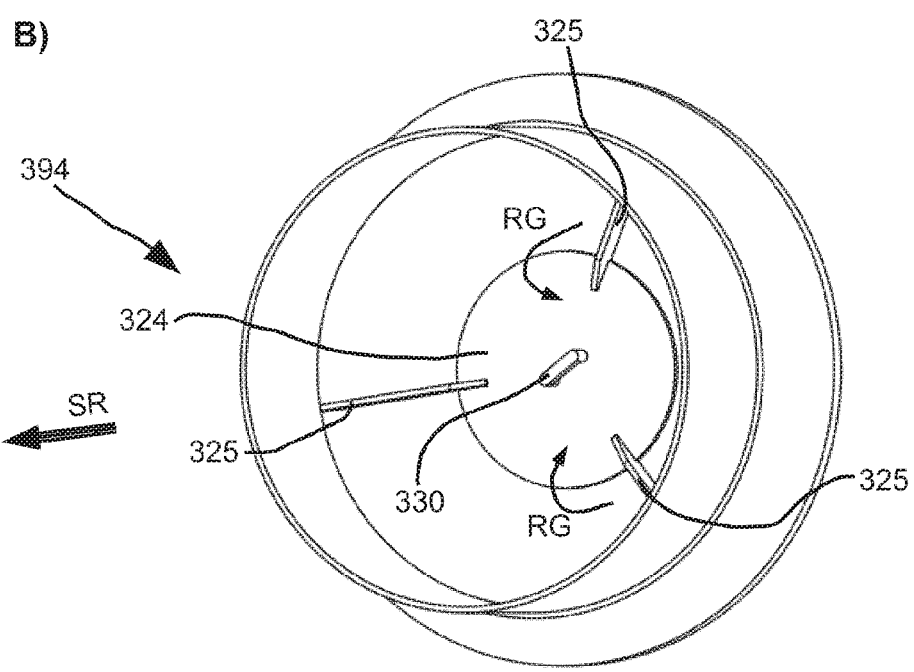

FIG. 14 shows, in the partial figures A) and B), two perspective and simplified views of a displacement element 324 configured as a plate. The displacement element 324 is, by way of example, mounted therein on the second conduction section 394 via radial struts 325. In the exemplary embodiment shown, the plate is a flat and non-curved plate. In alternative embodiments, they are concave or convex or, where required, otherwise curved plates, for example, similar in shape to the displacement element 124 shown in FIG. 6 or 7. The displacement element 324 is configured therein as a circular plate. However, it is also conceivable that the displacement element 324 is a polygonal plate, for example, a hexagon, an octagon or the like. A sensor element 330 is schematically shown behind the displacement element 324 in the direction of flow SR. The position of the sensor element 330 is, in particular, such that it is located within the recirculation region (indicated by bent arrows RG) of the displacement element 324. This design is provided either alternatively or supplementary to the designs with the bars. The design shown can, for example, be arranged at the air inlet opening 56 (see FIGS. 3 to 5) or at the air outlet opening 58 (see FIGS. 3 to 5) of the heating module, so that the temperature of the supplied or discharged air can be measured in each case.

Figure 15:
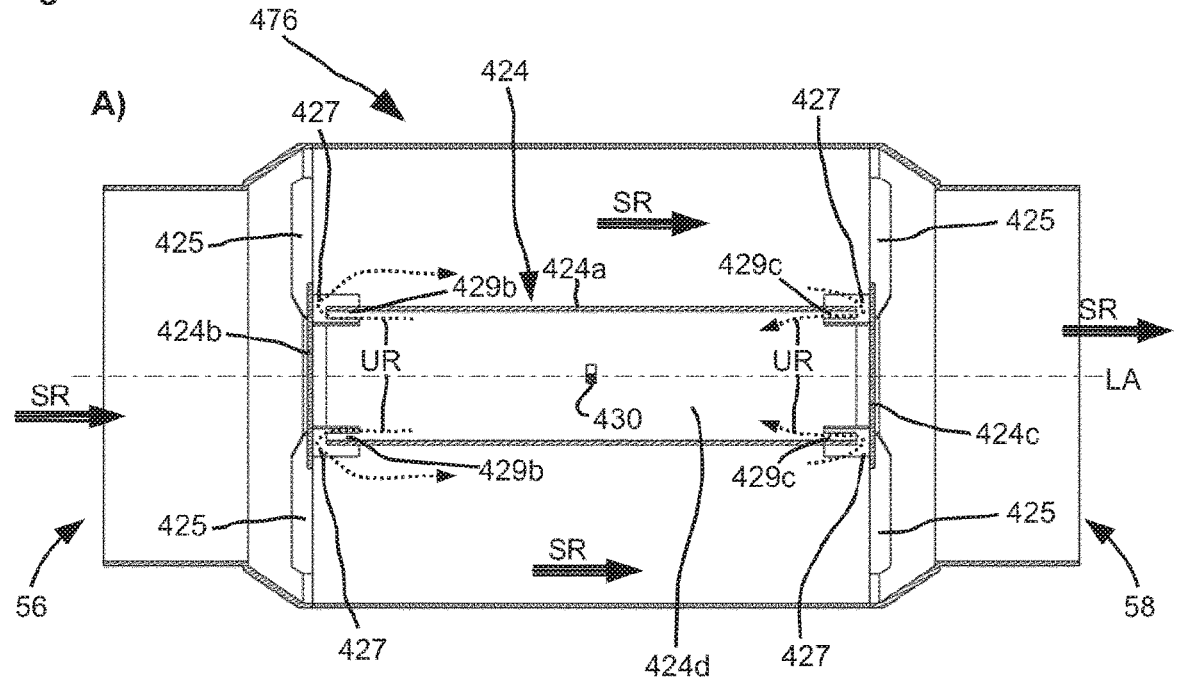
FIG. 15 shows, in partial figures A) and B), a longitudinal section view and a partially cut perspective view of the air conduction element with displacement element.
Figure 15:
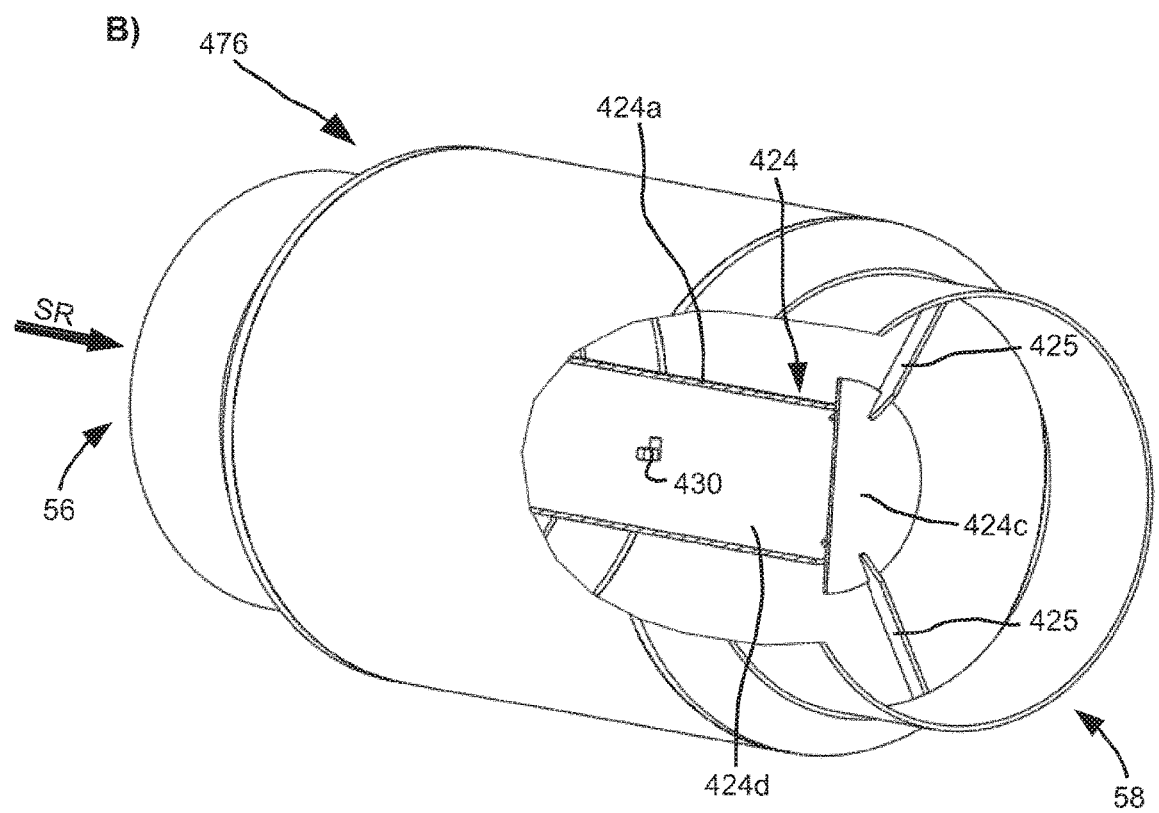

FIG. 15 shows, in partial figures A) and B) a simplified longitudinal sectional view and a simplified perspective partly sectional view of a displacement element 424 within the central area of the heating module or of the air conduction element 476 and thus within the area in which the air supplied is heated. The centric cylindrical—therein especially pipe-shaped—section 424a is restricted by two covers 424b, 424c, which are each configured as flat planes therein. However, the plates can also be curved. There are interspaces 427, which each allow the air to flow, between the cylindrical section 424a and the covers 424b, 424c. In addition, a sensor element 430 is arranged within the cylindrical section 424a, which is also located on the longitudinal axis LA as in the other embodiments. At its axial ends, the central section 424a is each housed within recesses 429b, 429c of the covers 424b, 424c. The recesses 429b, 429b can, for example, be configured as a ring groove. The covers 424b, 424c and the central section 424a held by them are arranged within the air conduction element 476 by means of struts 425.

In the displacement element 424, the air flows around the displacement element 424, in particular, around the central sections 424a, from the air inlet opening 56 (FIGS. 3 to 5) to the air outlet opening 58 (FIGS. 3 to 5) of the heating module. However, the air within the recess or the interior space 424d of the displacement element 424 or of the central section 424a flows in the reverse direction UR, i.e. back towards the air inlet opening 56. Therefore, open supply areas 427 and discharge areas 427 for the air are located at both ends of the cylindrical section 424a. The air conduction opposite to the direction of the main flow SR is illustrated by corresponding arrows UR in FIG. 15A.

The air conduction element 476 of FIG. 15 has, related to a central plane which orthogonally intersects the longitudinal axis LA, a substantially symmetrical structure. Accordingly, a heating module with such a design of the air conduction element 476 can be installed in the flow path of a heating system in any orientation.

FIG. 16A shows, in a simplified perspective view, the heating module 12 as already introduced in FIGS. 2 to 9. A bent or curved pipe piece 41 is mounted within the area of the air inlet opening 56. The pipe or the pipe bend 41 is connected to the module housing 36 by means of a pipe adapter 44 already shown in FIG. 5. Alternatively to such a pipe bend 41, it is also conceivable to connect a curved or bent tube (not shown) to the air inlet opening 56, in particular, using the pipe adapter 44 or an adapter possibly adjusted to tube connections. In this process, the pipe bend 41 is an exemplary embodiment of an air conduction component which serves the homogenization of the flow of the air supplied to the first heating module 12.

The curved or bent pipe section 41 serves, in particular, to supply air conveyed by a blower not shown to the heating module 12 in a preferably homogeneous flow. If a preferably homogeneous airflow is supplied, the effectiveness of the heating module 12 is enhanced.

FIG. 16B shows a sectional view (longitudinal section) through the pipe piece 41 and the transition into the module housing 36. A plurality of ribs or bend sections 43 are formed in the pipe bend 41. These ribs or bend sections 43 serve the conduction of air and are examples of deflectors inside the air conduction component. By way of example, four ribs or bend sections 43 are shown, with, by way of example, five channels 45 emerging therefrom within which air can flow. Due to the ribs or bend sections 43, air within the channels 45 can be deliberately conducted towards the deflectors 98. In other words, it can also be said that the deflectors 98 are extended by the ribs or bend sections 43.

The pipe adapter 44 has a first section 44b located upstream with a first inner diameter IM1. Downstream, a second section 44c with a second inner diameter IM2 is connected thereto. In this process, the first inner diameter IM1 is larger than the second inner diameter. The transition between the first section 44b and the second section 44c is formed by a locating surface 47. For example, a (straight) pipe or a tube or the bent pipe piece 41 can rest against this locating surface 47. In this process, the outer diameter of the pipe piece 41 is matched to the inner diameter IM1 of the first section 44b.

FIG. 16C shows the pipe adapter in a simplified perspective view. In particular, the two sections 44b and 44c can be seen. The locating surface 47 can be seen along the inner circumference of the two sections 44b, 44c. Click-stop elements 49 can be provided on the first section 44b, within which a pipe or tube to be connected is housed. The view shows, by way of example, two click-stop elements 49, with the number of the click-stop elements not being restricted to two, but can also be higher. It goes without saying that also corresponding counterparts, in particular, click-stop recesses, with which the click-stop elements 49 can engage, are available on the pipe or tube. Furthermore, also conduction recesses 51 can be arranged on the first section 44b. Corresponding conduction elements, which are present on the pipe to be connected (e.g. pipe bend 41) or on the tube to be connected, can be inserted into such conduction recesses 51.

The pipe adapter 44 can, for example, be connected to the module housing 12 by a plurality of screwed connections 53. Naturally, interlocking or corresponding connection structures on the pipe adapter 44 and on the pipe or pipe bend 41 to be connected can be differently configured than the click-stop elements 49 and the conduction recesses 51 shown therein. In particular, the click-stop elements and corresponding click-stop holders can be arranged interchanged. The same applies to conduction recesses and corresponding conduction elements.

In an alternative embodiment not shown, the pipe bend 41 is free of any curvature and thus corresponds to a straight pipe piece. The ribs or bend sections 43 of this embodiment of the pipe bend 41 are thus also free of any curvature in this embodiment.

In a supplementary embodiment, a pipe bend 41 of the shape described with reference to FIG. 16 or even without any curvature is located at the air outlet opening 56 of the heating module 12. Thus, depending on the embodiment, at least the air supplied or discharged is homogenized.

The heating system 10 presented herein with reference to FIGS. 1 to 4 or the (first) heating module 12 presented herein with reference to FIGS. 5 to 16 enables an installation of a heating system or an extension to an existing heating array within a habitable vehicle in a flexible manner. In particular, the (first) heating module 12 is configured as a compact electric heating installation, which can easily be connected to air conducting elements in such a manner that air can be heated by means of the (first) heating module 12. In this process, the (first) heating module 12 does not have an (integrated) blower of its own, but is connected to a separate blower which, in particular, can also be part of an existing heating installation (second heating module 28).

The invention claimed is:

1. A heating module for a heating system of a habitable vehicle, the heating module comprising:
    a module housing with an air inlet opening and an air outlet opening;
    an air conduction element housed within the module housing, which has a plurality of conduction sections and which is connected to the air inlet opening and the air outlet opening; and
    at least one heating element configured to heat air flowing from the air inlet opening to the air outlet opening,
    wherein the heating module has a sensor device configured to record the temperature of the air flowing through the heating module,
    wherein the sensor device is arranged within a sensor holder held by a plurality of bars, and wherein the bars extend in a radial direction from the sensor holder,
    wherein some or all of the bars have an air conduction channel configured to direct passing air towards the sensor device.

2. The heating module of claim 1, wherein some or all of the bars comprise a temperature-conducting material with a thermal conductivity greater than or equal to 15 W/(m*K).

3. The heating module of claim 1, wherein the sensor device is configured as a safety fuse which reacts to exceeding a specific temperature.

4. The heating module of claim 1, wherein the sensor device is arranged within an adapter device, which is reversibly connectable to the air inlet opening or to the air outlet opening of the module housing.

5. The heating module of claim 1, wherein the heating element is configured as an electric heating element, and wherein the heating element has at least one heating coil with a plurality of windings.

6. The heating module of claim 5, wherein in a direction of the air flow, successive windings of the at least one heating coil have a constantly changing diameter.

7. The heating module of claim 5, wherein the heating element has two heating coils arranged such that in a direction of the air flow, a winding one heating coil repeatedly follows a winding of the other heating coil.

8. The heating module of claim 7, wherein in a direction of the air flow, successive windings of the same heating coil have a constantly changing diameter.

\* \* \* \* \*